(12) United States Patent
Ashrafi

(10) Patent No.: US 11,621,836 B2
(45) Date of Patent: *Apr. 4, 2023

(54) QUANTUM RESISTANT BLOCKCHAIN WITH MULTI-DIMENSIONAL QUANTUM KEY DISTRIBUTION

(71) Applicant: NxGen Partners IP, LLC, Dallas, TX (US)

(72) Inventor: Solyman Ashrafi, Plano, TX (US)

(73) Assignee: NXGEN PARTNERS IP, LLC, Dallas, TX (US)

(*) Notice: Subject to any disclaimer, the term of this patent is extended or adjusted under 35 U.S.C. 154(b) by 385 days.

This patent is subject to a terminal disclaimer.

(21) Appl. No.: 16/922,589

(22) Filed: Jul. 7, 2020

(65) Prior Publication Data

US 2020/0344051 A1 Oct. 29, 2020

Related U.S. Application Data

(63) Continuation of application No. 16/673,447, filed on Nov. 4, 2019, now Pat. No. 10,708,046.

(Continued)

(51) Int. Cl.
*H04L 9/00* (2022.01)
*H04L 9/08* (2006.01)
(Continued)

(52) U.S. Cl.
CPC .......... *H04L 9/0858* (2013.01); *H04L 9/0637* (2013.01); *H04L 9/0643* (2013.01); *H04L 9/3247* (2013.01)

(58) Field of Classification Search
CPC ... H04L 9/0858; H04L 9/0637; H04L 9/0643; H04L 9/3247
(Continued)

(56) References Cited

U.S. PATENT DOCUMENTS 3,459,466 A 8/1969 Giordmaine
3,614,722 A 10/1971 Jones
(Continued)

FOREIGN PATENT DOCUMENTS

WO WO-2018134799 A1 * 7/2018 ............. H04B 10/50

OTHER PUBLICATIONS

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).
(Continued)

*Primary Examiner* — Christopher J Brown
(74) *Attorney, Agent, or Firm* — Gregory M. Howison

(57) ABSTRACT

A system for generating a blockchain including an input for receiving a plurality of groups of data. Blockchain processing circuitry generates the blockchain for the plurality of groups of data. The blockchain processing circuitry generates the blockchain by performing a first hash using the first group of data and a first nonce as an input to a hash function to generate a first digital signature for a first block, wherein the hash function uses encryption based on quantum key distribution and orbital angular momentum. The blockchain processing circuitry establishes the first block of the blockchain using the first group of data, the first nonce and the first digital signature. The blockchain processing circuitry performs a second hash using the second group of data, a second nonce and the first digital signature as an input to the hash function to generate a second digital signature for the second block, wherein the hash function uses encryption based on the quantum key distribution and the orbital angular momentum. The circuitry establishes the second
(Continued)

block of the blockchain using the second group of data, the second nonce, the first digital signature and the second digital signature.

26 Claims, 14 Drawing Sheets

Related U.S. Application Data

(60) Provisional application No. 62/757,477, filed on Nov. 8, 2018.

(51) Int. Cl.
*H04L 9/32* (2006.01)
*H04L 9/06* (2006.01)

(58) Field of Classification Search
USPC .......................................................... 380/44
See application file for complete search history.

(56) References Cited

U.S. PATENT DOCUMENTS

| | | |
|---|---|---|
| 4,379,409 A | 4/1983 | Primbsch et al. |
| 4,503,336 A | 3/1985 | Hutchin et al. |
| 4,736,463 A | 4/1988 | Chavez |
| 4,862,115 A | 8/1989 | Lee et al. |
| 5,051,754 A | 9/1991 | Newberg |
| 5,220,163 A | 6/1993 | Toughlian et al. |
| 5,222,071 A | 6/1993 | Pezeshki et al. |
| 5,272,484 A | 12/1993 | Labaar |
| 5,543,805 A | 8/1996 | Thaniyavarn |
| 5,555,530 A | 9/1996 | Meehan |
| 6,337,659 B1 | 1/2002 | Kim |
| 6,992,829 B1 | 1/2006 | Jennings et al. |
| 7,577,165 B1 | 8/2009 | Barrett |
| 7,729,572 B1 | 6/2010 | Pepper et al. |
| 7,792,431 B2 | 9/2010 | Jennings et al. |
| 8,432,884 B1 | 4/2013 | Ashrafi |
| 8,503,546 B1 | 8/2013 | Ashrafi |
| 8,559,823 B2 | 10/2013 | Izadpanah et al. |
| 8,811,366 B2 | 8/2014 | Ashrafi |
| 9,077,577 B1 | 7/2015 | Ashrafi et al. |
| 10,579,994 B1* | 3/2020 | Walters .............. G06Q 20/3825 |
| 11,240,013 B1* | 2/2022 | Vakili .................... H04L 9/0662 |
| 11,343,087 B1* | 5/2022 | Vakili .................... H04L 9/3228 |
| 2005/0254826 A1 | 11/2005 | Jennings et al. |
| 2005/0259914 A1 | 11/2005 | Padgett et al. |
| 2007/0230688 A1 | 10/2007 | Tajima et al. |
| 2010/0013696 A1 | 1/2010 | Schmitt et al. |
| 2012/0207470 A1 | 8/2012 | Djordjevic et al. |
| 2013/0027774 A1 | 1/2013 | Bovino et al. |
| 2013/0121330 A1 | 5/2013 | Ashrafi |
| 2013/0235744 A1 | 9/2013 | Chen et al. |
| 2014/0355624 A1 | 12/2014 | Li et al. |
| 2015/0098697 A1 | 4/2015 | Marom et al. |
| 2015/0249537 A1 | 9/2015 | Wabnig et al. |
| 2016/0248586 A1* | 8/2016 | Hughes ................. H04L 9/0852 |

OTHER PUBLICATIONS

Solyman Ashrafi, Performance Metrics and Design Considerations for a Free-Space Optical Orbital-Angular-Momentum Multiplexed Communication Link, The Optical Society, vol. 2, No. 4, Apr. 2015.
Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).
Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.
Solyman Ashrafi, Physical Phaseplate for the Generation of a Millimeter-Wave Hermite-Gaussian Beam, IEEE Antennas and Wireless Propagation Letters, RWS 2016; pp. 234-237.
Solyman Ashrafi, Solar Flux Forecasting Using Mutual Information with an Optimal Delay, Advances in the Astronautical Sciences, American Astronautical Society, vol. 84 Part II, 1993.
Solyman Ashrafi, Splitting and contrary motion of coherent bremsstrahlung peaks in strained-layer superlattices, Journal of Applied Physics 70:4190-4193, Dec. 1990.
Solyman Ashrafi, Splitting of channeling-radiation peaks in strained-layer superlattices, Journal of the Optical Society of America B 8(12), Nov. 1991.
Solyman Ashrafi, Spurious Resonances and Modelling of Composite Resonators, 37th Annual Symposium on Frequency Control, 1983.
Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).
Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.
Tamburini, Fabrizio; Encoding many channels on the same frequency through radio vorticity: first experimental test; New Journal of Physics 14, 033001 (2012).
Vasnetsov, M. V., Pasko, V.A. & Soskin, M.S.; Analysis of orbital angular momentum of a misaligned optical beam; New Journal of Physics 7, 46 (2005).
Wang, Jian, et al.; Terabit free-space data transmission employing orbital angular momentum multiplexing. Nature Photonics; 6, 488-496 (2012).
Yongxiong Ren et al.; Experimental Investigation of Data Transmission Over a Graded-index Multimode Fiber Using the Basis of Orbital Angular Momentum Modes.
Yan, Y. et al.; High-capacity millimetre-wave communications with orbital angular momentum multiplexing; Nature Communications; 5, 4876 (2014).
Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).
Anderson, Jorgen Bach; Rappaport, Theodore S.; Yoshida, Susumu; Propagation Measurements and Models for Wireless Communications Channels; 33 42-49 (1995).
Byun, S.H., Haji, G.A. & Young, L.E.; Development and application of GPS signal multipath simulator; Radio Science, vol. 37, No. 6, 1098 (2002).
CN: Office Action of 201580028235.4 (related application); dated Jul. 1, 2019; 18 pages.
EPO: Extended European Search Report for EP 15773688.5 (related application); Bernhard Koch; dated Nov. 15, 2017; 11 pgs.
Gibson, G. et al., Free-space information transfer using light beans carrying orbital angular momentum; Optical Express 12, 5448-5456 (2004).
H. Yao et al.; Patch Antenna Array for the Generation of Millimeter-wave Hermite-Gaussian Beams, IEEE Antennas and Wireless Propagation Letters; 2016.
Hur, Sooyoung et at.; Millimeter Wave Beamforming for Wireless Backhaul and Access in Small Cell Networks. IEEE Transactions on Communications, vol. 61, 4391-4402 (2013).
Iskander, Magdy F.; Propagation Prediction Models for Wireless Communication Systems; IEEE Transactions on Microwave Theory and Techniques, vol. 50., No. 3, 662-673 (2002).
JP: Office Action of 2016-560335 (related application); dated Mar. 5, 2019; 10 pgs.
Katayama, Y., et al.; Wireless Data Center Networking with Steered-Beam mmWave Links; IEEE Wireless Communication Network Conference; 2011, 2179-2184 (2011).
Li, X. et al.; Investigation of interference in multiple-input multiple-output wireless transmission at W band for an optical wireless integration system. Optics Letters 38, 742-744 (2013).

(56) References Cited

OTHER PUBLICATIONS

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).
Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).
Padgett, Miles J. et al., Divergence of an orbital-angular-momentum-carrying beam upon propagation. New Journal of Physics 17, 023011 (2015).
Rapport, T.S.; Millimeter Wave Mobile Communications for 5G Cellular: It Will Work!; IEEE Access, 1, 335-349 (2013).
Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).
Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).
Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).
Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).
Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).
Solyman Ashrafi, Acoustically induced stresses in elastic cylinders and their visualization, The Journal of the Acoustical Society of America 82(4):1378-1385, Sep. 1987.
Solyman Ashrafi, An Information Theoretic Framework to Increase Spectral Efficiency, IEEE Transactions on Information Theory, vol. XX, No. Y, Oct. 2014, Dallas, Texas.
Solyman Ashrafi, Channeling Radiation of Electrons in Crystal Lattices, Essays on Classical and Quantum Dynamics, Gordon and Breach Science Publishers, 1991.
Solyman Ashrafi, CMA Equalization for a 2 GB/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).
Solyman Ashrafi, Combining Schatten's Solar Activity Prediction Model with a Chaotic Prediction Model, National Aeronautics and Space Administration, Nov. 1991.
Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.
Solyman Ashrafi, Demonstration of Distance Emulation for an Orbital-Angular-Momentum Beam. OSA Technical Digest (online), paper STh1F.6. The Optical Society, 2015.
Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).
Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).
Solyman Ashrafi, Detecting and Disentangling Nonlinear Structure from Solar Flux Time Series, 43rd Congress of the International Astronautical Federation, Aug. 1992.
Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.
Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.
Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.
Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.
Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.
Solyman Ashrafi, Experimental Demonstralion of a 400-Gbit/s Free Space Optical Link Using Multiple Orbital-Angular-Momentum Beams with Higher Order Radial Indices. OSA Technical Digest (online), paper SW4M.5. The Optical Society, 2015.
Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.
Solyman Ashrafi, Experimental Demonstralion of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Experimental Demonstralion of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.
Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).
Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.
Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.
Solyman Ashrafi, Future Mission Studies: Forecasting Solar Flux Directly From Its Chaotic Time Series, Computer Sciences Corp., Dec. 1991.
Solyman Ashrafi, Link Analysis of Using Hermite-Gaussian Modes for Transmitting Multiple Channels in a Free-Space Optical Communication System, The Optical Society, vol. 2, No. 4, Apr. 2015.
Solyman Ashrafi, Nonlinear Techniques for Forecasting Solar Activity Directly From its Time Series, Proceedings of Flight Mechanics/Estimation Theory Symposium, National Aeronautics and Space Administration, May 1992.
Solyman Ashrafi, Optical Communications Using Orbital Angular Momentum Beams, Adv. Opt. Photon. 7, 66-106, Advances in Optics and Photonic, 2015.
Solyman Ashrafi, Orbital-Angular-Momentum-Multiplexed Free-Space Optical Communication Link Using Transmitter Lenses, Applied Optics, vol. 55, No. 8, pp. 2098-2103, 2016.

(56) References Cited

OTHER PUBLICATIONS

Solyman Ashrafi, PCS system design issues in the presence of microwave OFS, Electromagnetic Wave Interactions, Series on Stability, Vibration and Control of Systems, World Scientific, Jan. 1996.

* cited by examiner

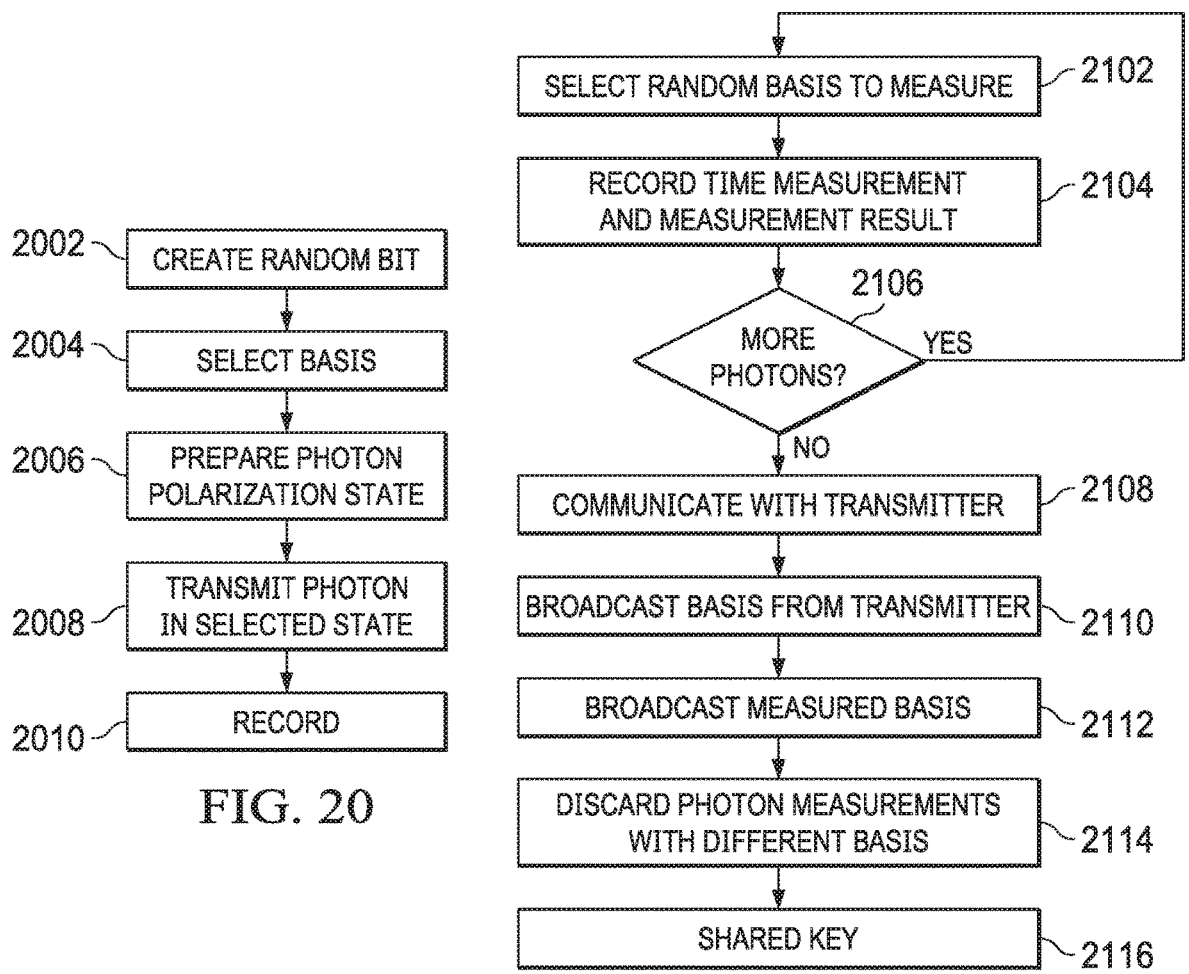

QUANTUM RESISTANT BLOCKCHAIN WITH MULTI-DIMENSIONAL QUANTUM KEY DISTRIBUTION

CROSS-REFERENCE TO RELATED APPLICATIONS

This application is a continuation of U.S. patent application Ser. No. 16/673,447, filed Nov. 4, 2019, entitled QUANTUM RESISTANT BLOCKCHAIN WITH MULTI-DIMENSIONAL QUANTUM KEY DISTRIBUTION, now U.S. Pat. No. 10,708,046, issued on Jul. 7, 2020, which claims the benefit of U.S. Patent Application No. 62/757,477, filed Nov. 8, 2018, entitled QUANTUM RESISTANT BLOCKCHAIN WITH MULTI-DIMENSIONAL QKD, the specifications of which are incorporated by reference herein in their entirety.

TECHNICAL FIELD

The present invention relates to blockchains, and more particularly, to a quantum resistant blockchain using quantum key distribution.

BACKGROUND

Quantum computers process information according to the laws of quantum mechanics. This means an increase in computational processing for specific problems (i.e. function inversion with Grover's algorithm, and factoring large numbers into prime factors with Shor's algorithm).

Blockchain offers an open, public, distributed ledger that has many applications, including digital currencies. The security of this ledger depends on the difficulty of solving certain cryptographic problems which are threatened by the potential of quantum computation. Specifically, hashes as used in signing the blocks of the ledger can be compromised.

The principal threat is Grover's algorithm, which can dramatically speed up function inversion. This allows the generation of a modified pre-image from a given hash (a hash collision) allowing a signed data block to be modified. This destroys authenticity of the ledger entries undermining the entire blockchain.

The second threat is Shor's algorithm, which applies to any part of blockchain that relies on asymmetric key cryptography. The main problem is that of breaking RSA encryption. RSA relies on the ease of multiplying prime numbers in contrast to the difficulty of factoring large numbers into prime factors. Shor's algorithm speeds-up this process exponentially, effectively breaking RSA encryption. Variants of Shor's algorithm do the same for other asymmetric key cryptosystems.

To counter these threats few quantum-resistant cryptographic tools have been developed. Currently, the National Institute of Standards and Technology is responsible for navigating this threat. Congress has tasked NIST with R&D in cryptographic standards and tools to counter the threat of quantum computation. No standards are developed yet. Therefore, a quantum version of Blockchain is needed that is resistant to Quantum attacks.

SUMMARY

The present invention, as disclosed and described herein, in one aspect thereof comprises a system for generating a blockchain including an input for receiving a plurality of groups of data. Blockchain processing circuitry generates the blockchain for the plurality of groups of data. The blockchain processing circuitry generates the blockchain by performing a first hash using the first group of data and a first nonce as an input to a hash function to generate a first digital signature for a first block, wherein the hash function uses encryption based on quantum key distribution and orbital angular momentum. The blockchain processing circuitry establishes the first block of the blockchain using the first group of data, the first nonce and the first digital signature. The blockchain processing circuitry performs a second hash using the second group of data, a second nonce and the first digital signature as an input to the hash function to generate a second digital signature for the second block, wherein the hash function uses encryption based on the quantum key distribution and the orbital angular momentum. The circuitry establishes the second block of the blockchain using the second group of data, the second nonce, the first digital signature and the second digital signature.

BRIEF DESCRIPTION OF THE DRAWINGS

For a more complete understanding, reference is now made to the following description taken in conjunction with the accompanying Drawings in which:

FIG. 20 is a flow diagram illustrating the process for a transmitter transmitting a quantum key;

FIG. 21 illustrates the manner in which the receiver may receive and determine a shared quantum key;

FIG. 22 more particularly illustrates the manner in which a transmitter and receiver may determine a shared quantum key;

DETAILED DESCRIPTION

Figure 1:
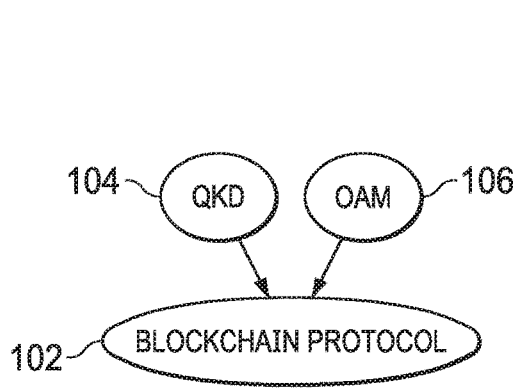
FIG. 1 illustrates an information-theocratic protocol using a combination of quantum key distribution and orbital angular momentum.

Referring now to the drawings, wherein like reference numbers are used herein to designate like elements throughout, the various views and embodiments of a quantum resistant blockchain with multi-dimensional quantum key distribution system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, a new information-theoretic secure protocol is introduced that is robust for current and future quantum attacks. It is a quantum resistant blockchain protocol 102 that uses multi-dimensional QKD 104 using Orbital Angular Momentum (OAM) states 106 of photons. Photons are quantas of electromagnetic signals and therefore suitable for this protocol as the 2-dimensional QKD has already been demonstrated both in fiber optics as well as satellite communications. This multi-dimensional QKD protocol 104 can also be extended for development of a global QKD network and "quantum Internet" and extend quantum-safe blockchain platforms to a global scale.

Classical and Quantum Computation

The physical laws relevant to the information processing system are important to understanding the limitations of computation. In general, Quantum Mechanics adds features that do not exist in classical mechanics. Physical quantities are "quantized," i.e. cannot be subdivided. Quantum mechanics further requires physical states to evolve in such a way that cloning a state into an independent copy is not possible. This is used in quantum cryptography to prevent information copying. Quantum mechanics also describes systems in terms of superposition that allow multiple inputs to be processed simultaneously, though only one can be observed at the end of processing, and the outcome is probabilistic in nature. Finally, quantum mechanics allows for entanglement that is not possible in classical physics.

Many computational algorithms and data structures have been developed for use on classical computers. Many of these algorithms have parallels on quantum computers but due to the quantum mechanical nature of the information processing could have far greater power. The simplest example of this is called Deutsch's Problem, which demonstrates that quantum computation can be significantly faster than classical computation.

RSA encryption relies on the fact that multiplication of large primes is easy and thus fast but factoring large composite numbers into two prime factors is very difficult and thus slow. Hash functions have the important property of being easy to calculate but difficult to invert. They provide a unique fingerprint precisely because it is very difficult to take a given hash value and find a chosen pre-image that yields that hash.

The threat of quantum computation is that such algorithms become useless because the premise of asymmetric effort of computation is invalidated. Quantum computing provides potential attacks on many cryptographic systems and algorithms. As of now, no quantum computer exists to perform such computations, though there is no doubt as to the usefulness of the algorithms themselves and of their threat to cryptographic systems. Such a quantum computer would need to have at least as many qubits as the output of the computations, e.g. 256 logical qubits to encode a hashing function with a 256-bit output. Each logical Qbit will likely need to be composed of some unknown large number of physical qubits, and the current state of the art quantum computer have small number of physical qubits.

Blockchain

The first blockchain structure was initially developed in the context of the digital currency Bitcoin to solve the problem of multiple spending.

Figure 2:
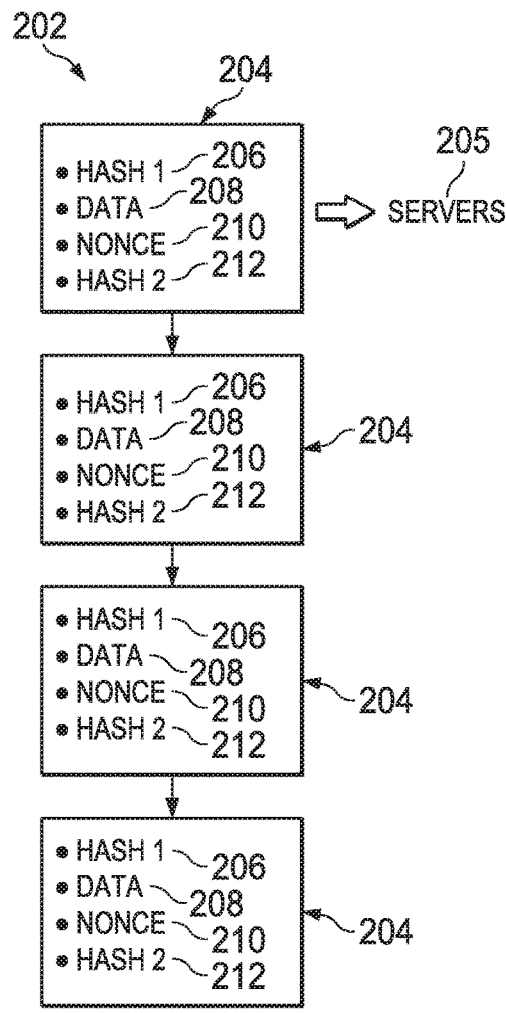
FIG. 2 illustrates a blockchain structure.

The core component implements an open, distributed, cryptographically signed digital ledger that is secure against modification and verifiable by anyone. To prevent bulk rewriting of an entire sequence of blocks from some point in the past as well as attacks to deny service or grow the chain faster than legitimate sources can, a work requirement is added to make rewriting long chains prohibitive. For our purposes here, the relevant structure of blockchain amounts to the following description as illustrated in FIG. 2.

The blockchain 202 consists of a sequence of blocks 204 that are stored on and copied between publicly accessible servers 205. Each block 204 consists of four fundamental elements including the first hash 206 of the preceding block; the data content of the block (i.e. the ledger entries) 208; the nonce 210 that is used to give a form to the hash; and the second hash 212 of the block.

By including the hash 206 of the preceding block 204, each successive block strengthens the authenticity claim for the preceding block. Blocks 204 early in the chain 202 cannot be modified without modifying all subsequent blocks or the modification will appear as an inconsistency in the hashes. Also, adding the data 208 to the hash makes the data unmodifiable without breaking the consistency of the block sequence. Adding a nonce 210 that is used to impose a signature structure to the hash requires significant work to be performed to generate a new block 204. This implements the work requirement, thereby preventing the recreation of a long chain of blocks 204 to supersede the existing chain 202 with modified data.

Quantum Computation Algorithms

Figure 3:
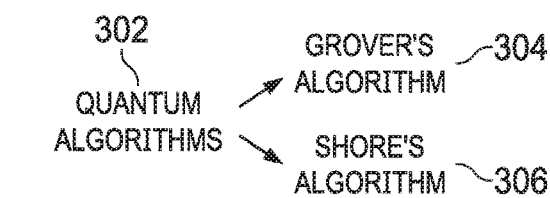
FIG. 3 illustrates various types of quantum algorithms.

Referring now to FIG. 3, to understand blockchain in the context of quantum computing and quantum attacks, you must understand two fundamental quantum algorithms 302:

Grover's Algorithm 304 and Shor's Algorithm 306. Grover's 304 is a search algorithm to find a unique input to a black box function which operates faster than a brute force search, thus compromising hash functions of deficient length. Shor's 306 provides an exponential speed increase in factoring integers and, can be applied to the hidden subgroup and discrete logarithm problems. These problems are at the heart of breaking many known asymmetric ciphers, and thus are relevant to breaking things like public key cryptography and digital signatures. Taken together, the two quantum algorithms 302 present a significant danger to systems implementing blockchain.

Grover's Algorithm

Blockchain relies on the computation of hashes to provide security against modification of the past blocks. The chain is secure against extended revision by both its distributed nature and the computational effort required to re-compute a chain of blocks. Modification of a single block is secured by the difficulty of finding a hash collision with the existing hash, which amounts to the problem of inverting the hash function.

Grover's algorithm 304 is specifically a solution to the problem of finding a pre-image of a value of a function that is difficult to invert. If we are given a signature that is the hash value of some data s=H(d), and the function H(d) can be implemented on a quantum computer, then Grover's algorithm 304 allows us to find d for a given sin time of order $O(\sqrt{n})$ where n is the size of the space of valid hashes. In other words, it allows us to generate hash collisions more efficiently than brute force search, which would be (n).

For a hash of length k bits this means that we have a significant speedup by a factor of $2^{k/2}$. This can be very large even for small values of k.

Shor's Algorithm

Shor's Algorithm 306 provides a significant improvement in the efficiency of factoring large numbers. Thus, Shor's algorithm 306 can be used to attack RSA encryption and related problems. The complexity of the general number field is super-polynomial (run time longer than any polynomial in the input length) but sub-exponential (shorter than exponential in the input length). Shor's algorithm 306 on the other hand is polynomial in the input length, making the gain in speed roughly exponential. In practical terms, this makes RSA keys of 4096 bits in practice unbreakable with classical computation, but breakable with quantum computation. The consequence is that any aspect of a blockchain implementation that relies on RSA or similar algorithms would be vulnerable to quantum attack.

The first target of Shor's algorithm 306 was the factoring of large composite integers consisting of a product of two large primes. However, factoring is a specific case of the more general hidden subgroup problem, and modifications of Shor's algorithm 306 can solve all such problems. This allows solution of problems such as the discrete logarithm problem, which in turn makes such cryptographic algorithms as ElGamal encryption, Diffie-Helman key exchange, the Digital Signature Algorithm, and elliptic curve cryptography insecure. The existence of Shor's algorithm 306 demonstrates that a quantum computer opens vulnerabilities beyond that of just hash collision generation or function inversion by Grover's algorithm 304.

Threat to Blockchain

Figure 4:
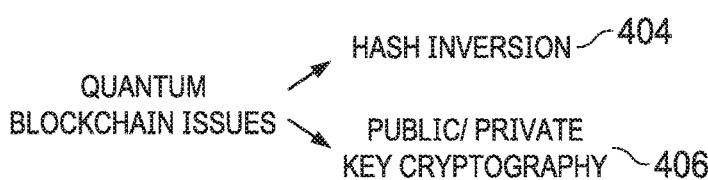
FIG. 4 illustrates different Quantum Blockchain issues.

As shown in FIG. 4, in quantum computing, there are two issues invalidating the promises of blockchain. First, the inversion of hashes 404 is assumed to be computationally difficult. If this can be simplified by a quantum computer, the authenticity of the blockchain can no longer be guaranteed and the authenticity of entries in the blockchain is compromised. Grover's algorithm can do so significantly faster than the classical brute force search.

Figure 5:
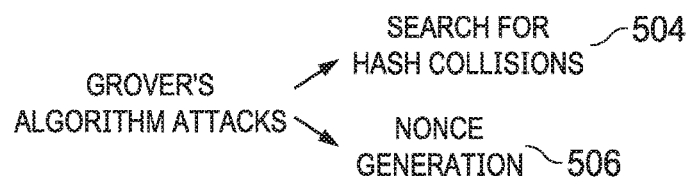
FIG. 5 illustrates uses of Grover's algorithms.

Referring now to FIG. 5, Grover's algorithm can be used in two ways to attack the blockchain. The first is that it can be used to search for hash collisions 504 which can be used to replace blocks without disturbing the integrity of the blockchain. The second is that it can speed up the generation of nonces 506, to the point that entire chains of records can be recreated with consistent modified hashes quickly enough to weaken the integrity of the chain. In both cases the algorithm is used to find the pre-image of a given value under a difficult to invert function.

As a secondary threat, in any part of a blockchain implementation that uses public/private key cryptography 406, whether it is in an information exchange between parties or in digital signatures, a quantum computer may be able to break the security of the encryption.

Grover's Algorithm Attack (Full Collision)

If full collisions of hash values can be generated, it is possible to take a modified block content and a given hash and add trivial data to the content to make the given hash consistent with the block content. In general, this problem is computationally difficult. The general case assumes that it requires a brute force search through the possible source data with enough additional bits to finish the hash space until a case is found that matches the known hash value. For an ideal hash, this requires linear time in the size of the hash space. Weaknesses in the hash function can reduce this time, but generally the reduction is not large. The expected classical run time is of order (n) for this classical attack.

Grover's algorithm runs in time $(\sqrt{n})$, and so would give a speedup of $(\sqrt{n})$ compared to classical collision search algorithm. This makes it possible to insert a modified block into the chain without compromising the sequential consistency of the blocks. This speed increase is equivalent to finding a hash collision by brute force with half as many bits in the hash. Since this attack is only moderately fast, one could consider increasing (doubling) the hash length, but the computational effort to calculate the nonce with longer hashes would limit the ability to generate the chain and would make the blockchain not viable.

The worst scenario (asymmetric case) is the attacker has a quantum computer and the defender has only a classical computer. A slightly better scenario is when both parties have the same computational capability (symmetric case) because then there is hope that the balance of time to generate hashes and to invert hashes remains like the classical case. If this is true, the operational consequence is that whoever gets quantum computational capacity first has an advantage, but only until the defending parties develop the capacity themselves. At that point, we expect that either the system is again viable, or the system is broken beyond repair and must be discarded.

Grover's Algorithm Attack (Mining Time)

The mining step of the blockchain growth has another problem: the calculation of the nonce. This calculation adds computational cost to re-writing the chain and amounts to finding a pre-image to a partially defined hash. Grover's algorithm could speed up the generation of nonces, making the reconstruction of the blockchain from a modified block forward much faster, thereby opening the attack of regenerating the chain by undermining the computational effort of extension.

It becomes feasible for a party with a quantum computer to rapidly outperform competitors, who have only classical computing capacity, in generating additional blocks on the chain. In crypto-currency applications this means that the mining step becomes much shorter and thus allows individuals to obtain more currency than others by mining faster. In the case of a consensus blockchain for other ledger applications, the fastest miners will dominate the generation of new blocks and thus can take control of the content of the blockchain.

Of course, if the generation of nonces is even faster, there is nothing to prevent a wholesale re-creation of an entire blockchain in short time, and then substituting that history by growing faster than others can grow the true chain. Since the longest chain is conventionally chosen as the accepted truth, the faster growing chain will come to dominate the blockchain, basically re-writing history.

Threats Outside of Hashes

Hashes are susceptible to Grover's algorithm for finding function pre-images. Shor's algorithm, on the other hand, is highly effective at factoring integers and solving the hidden subgroup problem. Any part of blockchain that uses public/private key algorithms is susceptible to attack with Shor's algorithm. The algorithm serves to find the two prime factors of a composite integer used as a public key in an algorithm like RSA. Being able to factor the integer, which is computationally challenging on classical computers, gives the attacker the private key of the public/private pair. That makes it possible for the attacker to forge messages, signatures, etc. While this is not a threat to the blockchain structure of linked hashes, nor to the generation or re-generation of nonces, it means that, for example, any content that is signed may be forged by an intermediary in the process, passing the forged content on to the blockchain where it gets incorporated and thereby gains the validity of being part of the publicly readable and verifiable record.

Also, any encrypted communications used in blockchain infrastructure is vulnerable to an attacker who can break the cryptographic security of the communications. While this is removed from the core features of a blockchain, it is important.

Quantum-Resistant Cryptography

The advances in quantum computers will have a major impact on algorithms used for cryptographic applications. According to the Information Assurance Directorate (IAD) of the NSA, algorithms used in national security systems require twenty years for full deployment and should be designed to protect information for at least thirty years. One cannot predict if or when a large-scale quantum computer will ever be manufactured, however many anticipate such a system within these timescales. Therefore, the development of cryptographic algorithms which are "quantum resistant" has been determined to be a national priority.

Quantum resistant cryptography, also known as post-quantum cryptography, is a field that includes potential attacks using a quantum computer as part of the analysis of (classical) cryptographic algorithms. Although there are some insights in this area, as mentioned above, it is still a very new area with uncertainty and no accepted standards. To remedy this problem Congress has tasked the National Institute of Standards and Technology (NIST) to "research and identify, or if necessary, develop cryptography standards and guidelines for future cybersecurity needs, including quantum-resistant cryptography standards." NIST has already initiated this process, and public updates to this process are posted to <http://www.nist.gov/pqcrypto>.

Post-Quantum Cryptography for Blockchain with Hash Functions

Even though standards are still being developed for quantum resistant cryptography, parts that will be important for designing systems that involve blockchain based technologies can be determined. The first part is related to the hashing function itself. As described, Grover's algorithm provides a quadratic speedup over classical algorithms for evaluating hash functions. Since this speedup is not an exponential speedup like Shor's algorithm, this means that the computational complexity of a function that is needed for secure applications can be restored by increasing the number of bits used in the calculation. At most one needs only twice the number of bits due to the quadratic speedup of the algorithm.

As previously described, there are two parts in which hash functions are used to protect a blockchain. The primary method based on inverting a hash or finding a collision is computationally difficult. The difficulty in finding a different data block with the same hash grows with the length of the hash. The complexity is of order (n) classically, but ($\sqrt{n}$) with Grover's algorithm for a hash space of size n. So, if a certain level of difficulty is required for security, a quantum-resistant standard will require twice the hash length of a similar requirement that considers only classical algorithms.

The second way in which blockchain may utilize hash functions for security is by signing a block. This is done for example by finding a nonce such that the first m bits of the block's hash are zero. This is equivalent to computing a partial collision of the hash function and is computationally difficult. This difficulty is precisely the 'proof of work' that a signature is designed to require. Just as the hash length k can be increased in order to maintain a level of protection against a quantum attack, so also the length m required for signing the block can be increased to ensure a minimal 'proof of work'. However, this comes at the expense of making the required work computationally twice as hard per additional bit, or equivalently take twice as long, for the classical devices that are used to sign a data block. Therefore, there will be an inherent trade-off between the system requirements necessary for implementing any blockchain protocol that uses hash-based block signatures and protecting against a spoofing attack from a quantum machine.

Post-Quantum Cryptography Outside of Blockchain Hash Function

If the blockchain ledger needs to be distributed, then encryption schemes will be required. Other protocols are also needed to define what entities are (allowed to expand the blockchain), where identity verifications or digital signatures might be utilized. In many of these cases, current standard cryptographic algorithms are generally insufficient to protect against the threat of quantum computing.

A key issue with many current cryptographic algorithms is that security relies on the difficulty of a mathematical problem. The asymmetric key encryption scheme of RSA relies on the difficulty of prime factorization of large numbers; the Digital Signature Algorithm (DSA), the standard for digital signatures, is based on the problem of computing discrete logarithms; and the Elliptic Curve Digital Signature Algorithm (ECDSA) is a variant of DSA and example of elliptic curve cryptography (ECC). All three types of problems of factorization, discrete logarithms, and ECC can easily be solved by Shor's algorithm on a quantum computer.

Figure 6:
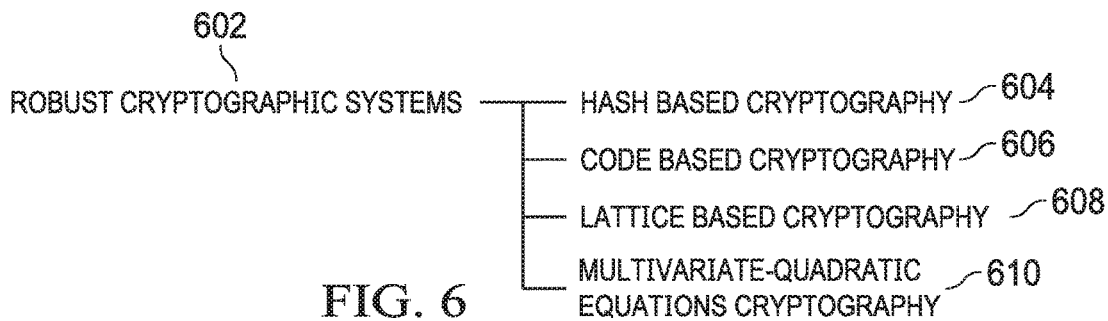
FIG. 6 illustrates different types of Cryptographic Systems.

Although NIST has yet to define quantum-resistant cryptographic standards, there are several classes of cryptographic systems 602, as shown in FIG. 6, that are relatively robust to attacks from either classical or quantum devices. Some of them are:

Hash-based cryptography 604. The classic example is Merkle's hash-tree public-key signature system, building upon a one-message-signature idea of Lamport and Diffie.

Code-based cryptography 606. The classic example is McEliece's hidden Goppa-code public-key encryption system.

Lattice-based cryptography 608. The example that has perhaps attracted the most interest, not the first example historically, is the Hoffstein-Pipher-Silverman "NTRU" public-key-encryption system.

Multivariate-quadratic-equations cryptography 610. One of many interesting examples is Patarin's Hidden Field Equations public-key-signature system, generalizing a proposal by Matsumoto and Imai.

Quantum Cryptography

Another strategy for future crypto-systems involves leveraging quantum features in new technology. This field of quantum cryptography is distinct from post-quantum cryptography which relies purely on classical methods and present-day technologies to protect against potential future quantum attacks. Instead, quantum cryptography is itself part of quantum information science and looks for how quantum effects can create fundamentally new ways of doing cryptography.

The primary and most mature technology that has come out of quantum cryptography is quantum key distribution (QKD) as is more fully described herein below. QKD is a protocol by which a random bitstream can be generated between parties. Once established, this random bitstream message is used as a one-time pad (OTP) to encrypt a secret message. This method of distributing a secret shared key is not secured by mathematical complexity like normal methods of distributing cryptographic keys (e.g. Diffie-Hellman), but instead is based on the laws of quantum physics itself. This security specifically comes from the Quantum No-cloning theorem, a consequence of the Heisenberg uncertainty principle which states a signal made of individual quantum particles cannot be copied without introducing observable errors, preventing any eavesdropper from avoiding detection. Once a random key has been established between two parties with a QKD protocol, the encrypted message is considered unconditionally secure.

QKD is the most mature technology within the field of quantum information science. Commercial companies exist that will sell transmitters and receivers, and such systems have been used in both the private and public sectors. The technology currently requires private networks (e.g. dark fibers), cannot be repeated or routed and is currently limited to city scale networks. Although there are limitations, the technology is still developing fast and so will likely become more extensive in the near-future.

In addition to QKD, there are other ideas that are being researched that could make a significant impact to blockchain based systems. For instance, information can be encoded and transmitted directly into a quantum stream (rather than just using a quantum channel to distribute a key). There has also been a proposal for a "Quantum Bitcoin," which uses a classical blockchain ledger but uses quantum methods to mine and verify a block. There are also protocols to encode and store information such as a ledger in a quantum system making the information tamper-proof. There are also quantum bit commitment protocols which may be a type of alternative to digital signature schemes. Many of these ideas may have promise, however these technologies are currently at early stages with many of the technologies being at least as difficult to implement as quantum computing itself.

As indicated, current blockchain relies on two one-way computational technologies: cryptographic hash functions and digital signatures. Most blockchain platforms rely on the elliptic curve public-key cryptography (ECDSA) or the large integer factorization problem (RSA) to generate a digital signature. The security of these algorithms assumes computational complexity of certain mathematical problems.

As described, a universal quantum computer would enable efficient solving of these problems, thereby making corresponding digital signature algorithms, including those used in blockchains, insecure. As described, Shor's quantum algorithm solves factorization of large integers and discrete logarithms in polynomial time and Grover's search algorithm allows a quadratic speedup in calculating the inverse hash function. This will enable a so-called 51-percent attack, in which a syndicate of malicious parties controlling most of the network's computing power would monopolize the mining of new blocks. Such an attack would allow the perpetrators to sabotage other parties' transactions or prevent their own spending transactions from being recorded in the blockchain. Other attacks with quantum computing on blockchain technology as well as possible roles of quantum algorithms in the mining process are considered in recent work.

The security of blockchains can be enhanced by using post-quantum digital signature schemes for signing transactions. Such schemes are robust against attacks with quantum computers. However, this robustness relies on unproven assumptions. Also, post-quantum digital signatures are computationally intensive and are not helpful against attacks that utilize the quantum computer to dominate the network's mining.

In addition to the blockchains based on mining principles there are other approaches to distributed ledgers maintenance, e.g. Byzantine fault tolerance (BFT) replication and practical BFT replication. All the proposed approaches either require use of digital signatures, and hence are vulnerable to quantum computer attacks, or pairwise authenticated channels at least. The pairwise authentic channel ensures that each message was not tampered while passing but does not solve the transferability issue.

The way to guarantee authentication in the quantum era is to use quantum key distribution (QKD), which guarantees information-theoretic (unconditional) security based on the laws of quantum physics. QKD can generate a secret key between two parties connected by a quantum channel (for transmitting quantum states) and a public classical channel (for post-processing procedures). The technology enabling QKD networks have been demonstrated in many experiments and is now publicly available through some suppliers.

Kiktenko and Pozhar described a blockchain platform that combines (i) the original BFT state-machine replication without use of digital signatures ("broadcast protocol"), (ii) A 2-dimensional QKD for providing authentication, and implemented an experiment demonstrating its capability in an urban QKD network. This 2-dimensional scheme is robust against presently known capabilities of the quantum computer, but it is not robust against future quantum attacks.

The utility of QKD for blockchains may appear counter-intuitive, as QKD networks rely on trust among nodes, whereas the earmark of many blockchains is the absence of such trust. More specifically, one may argue that QKD cannot be used for authentication because it itself requires an authenticated classical channel for operation. However, each QKD communication session generates a large amount of shared secret data, part of which can be used for authentication in subsequent sessions. Therefore, a small amount of "seed" secret key that the parties share before their first QKD session confirms their secure authentication for all future communication. In this way, QKD can be used in lieu of classical digital signatures.

Figure 7:
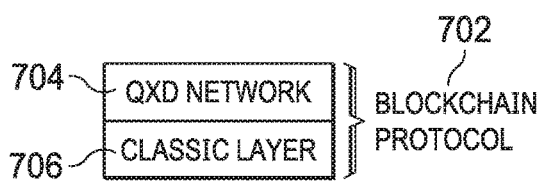
FIG. 7 illustrates a multilayer blockchain protocol.
Figure 8:
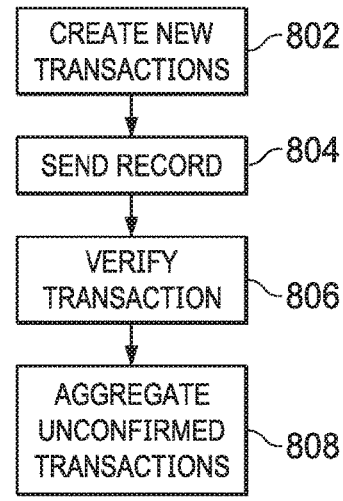
FIG. 8 illustrates a flow diagram of a process for aggregating transactions.

Referring now to FIG. 7, consider a blockchain protocol 702 within a two-layer network with n nodes. The first layer is a QKD network 704 with pairwise communication channels that permit establishing information-theoretic (unconditionally) secure private key for each pair of nodes. The second (classical) layer 706 is used for transmitting messages with authentication tags based on information-theoretic secure hashing that are created using the private keys procured in the first layer. For example, a blockchain with a digital currency can be considered. The operation of the blockchain is based on two procedures: (i) creation of transactions and (ii) construction of blocks that aggregate new transactions. As shown in FIG. 8, new transactions are created at step 802 by those nodes who wish to transfer their funds to another node. Each individual new transaction record is constructed like those in Bitcoin, i.e. contains the information about the sender, receiver, time of creation, amount to be transferred, and a list of reference transactions that justifies that the sender has enough funds for the operation. This record is sent at step 804 via authenticated channels to all other n−1 nodes, thereby entering the pool of unconfirmed transactions. Each node checks these entries with respect to their local copy of the database and each other, in order to verify that each transaction has sufficient funds and forms an opinion regarding the transaction's acceptability at step 806. At this stage, the community does not attempt to exclude double-spending events. Next, the unconfirmed transactions are aggregated into a block at step 808. The classical blockchain practice of having the blocks proposed by individual "miners" is eliminated, because it is vulnerable to quantum computer attacks in at least two ways. First, transactions are not arranged with digital signatures. This means that a miner has complete freedom to fabricate arbitrary transactions and include them in the block. Second, a node with a quantum computer is able to mine new blocks significantly faster than any classical node. This opens a possibility for attacks such as the 51-percent attack described above.

Instead, it is better to create blocks in a decentralized fashion. To that end, one can use the broadcast protocol proposed in the classic paper by Shostak and Lamport. This secure protocol allows achieving a Byzantine agreement in any network with pairwise authenticated communication provided that the number of dishonest parties is less than n/3. At a certain moment in time (e.g. every ten minutes), the network applies the protocol to each unconfirmed transaction, arriving at a consensus regarding the correct version of that transaction (thereby eliminating double-spending) and whether the transaction is acceptable. Each node then forms a block out of all acceptable transactions, sorted according to their time stamps. The block is added to the database. In this way, the same block will be formed by all honest parties, thereby removing the possibility of a "fork" which is the situation in which several different versions of a block are created simultaneously by different miners.

Because the broadcast protocol is relatively forgiving to the presence of dishonest or faulty nodes, this blockchain setup has significant tolerance to some of the nodes or communication channels not operating properly during its implementation. While the broadcast protocol is relatively data intensive, the data need not be transmitted through quantum channels. Quantum channels are only required to generate private keys.

While this protocol seems to be efficient against quantum attacks on the distribution of transactions and formation of blocks, the database is still somewhat vulnerable while it is stored. A possible attack scenario is as follows: a malicious party with a quantum computer works offline to forge the database. It changes one of the past transaction records to its benefit and performs a Grover search for a variant of other transactions within the same block such that its hash remains the same, to make the forged version appear valid. Once the search is successful, it hacks into all or some of the network nodes and substitutes the legitimate database by its forged version. However, the potential of this attack to cause significant damage is low, because the attacker would need to simultaneously hack at least one-third of the nodes to alter the consensus. Also, because the Grover algorithm offers only a quadratic speed-up with respect to classical search algorithms, this scenario can be prevented by increasing the convention on the length of the block hash to about a square of its safe classical value.

Figure 9:
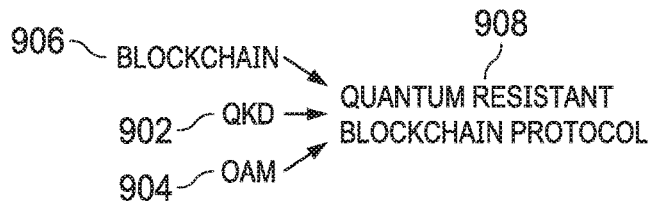
FIG. 9 illustrates the components of a quantum resistant blockchain protocol.

A new information-theoretic secure protocol that is robust for current and future quantum attacks is shown generally in FIG. 9. It is a quantum resistant blockchain protocol 908 that uses multi-dimensional QKD 902 using Orbital Angular Momentum (OAM) states of photons with blockchain 906. Photons are quantas of electromagnetic signals and therefore suitable for this protocol as the 2-dimensional QKD has already been demonstrated both in fiber optics as well as satellite communications. This multi-dimensional protocol can also be extended for development of a global QKD network and "quantum Internet" and extend quantum-safe blockchain platforms to a global scale.

Orbital Angular Momentum (OAM)

Figure 10:
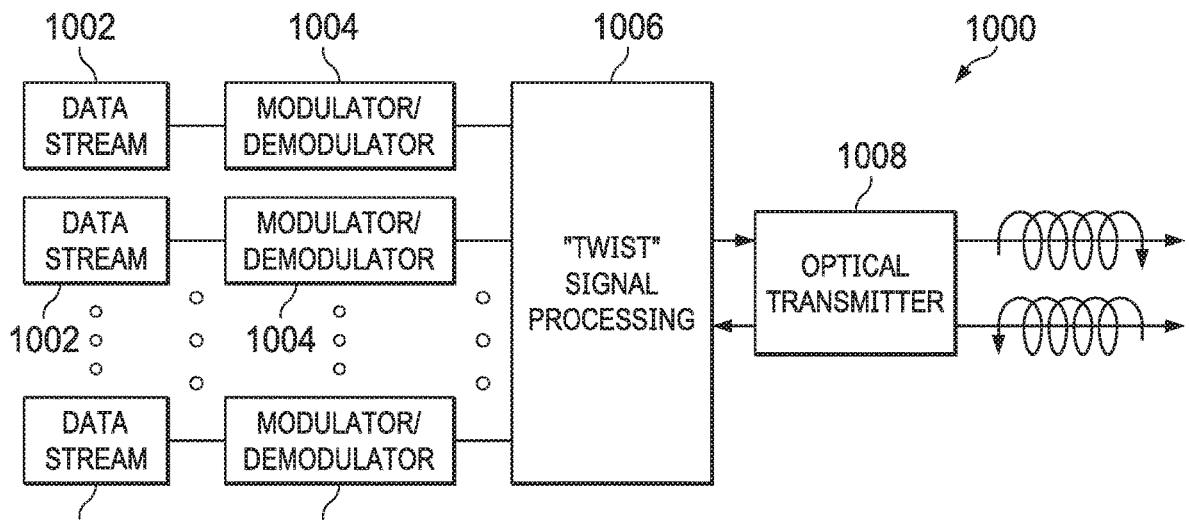
FIG. 10 is a functional block diagram of a system for generating orbital angular momentum within a communication system.

The orbital angular momentum (OAM) component will now be more fully described. Referring now more particularly to FIG. 10, there is illustrated a functional block diagram of a system for generating the orbital angular momentum "twist" within a communication system, such as that illustrated with respect to FIG. 3, to provide a data stream that may be combined with multiple other data streams for transmission upon a same wavelength or frequency. Multiple data streams 1002 are provided to the transmission processing circuitry 1000. Each of the data streams 1002 comprises, for example, an end to end link connection carrying a voice call or a packet connection transmitting non-circuit switch packed data over a data connection. The multiple data streams 1002 are processed by modulator/demodulator circuitry 1004. The modulator/demodulator circuitry 1004 modulates the received data stream 1002 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1006. Each of the modulated data streams from the modulator/demodulator 1004 are provided a different orbital angular momentum by the orbital angular momentum electromagnetic block 1006 such that each of the modulated data streams have a unique and different orbital angular momentum associated therewith. Each of the modulated signals having an associated orbital angular momentum are provided to an optical transmitter 1008 that transmits each of the modulated data streams having a unique orbital angular momentum on a same wavelength. Each wavelength has a selected number of bandwidth slots B and may have its data transmission capability increase by a factor of the number of degrees of orbital angular momentum $\ell$ that are provided from the OAM electromagnetic block 1006. The optical transmitter 1008 transmitting signals at a single wavelength could transmit B groups of information. The optical transmitter 1008 and OAM electromagnetic block 1006 may transmit $\ell \times B$ groups of information according to the configuration described herein.

In a receiving mode, the optical transmitter 1008 will have a wavelength including multiple signals transmitted therein having different orbital angular momentum signals embedded therein. The optical transmitter 1008 forwards these signals to the OAM signal processing block 1006, which separates each of the signals having different orbital angular momentum and provides the separated signals to the demodulator circuitry 1004. The demodulation process extracts the data streams 1002 from the modulated signals and provides it at the receiving end using the multiple layer overlay demodulation technique.

Figure 11:
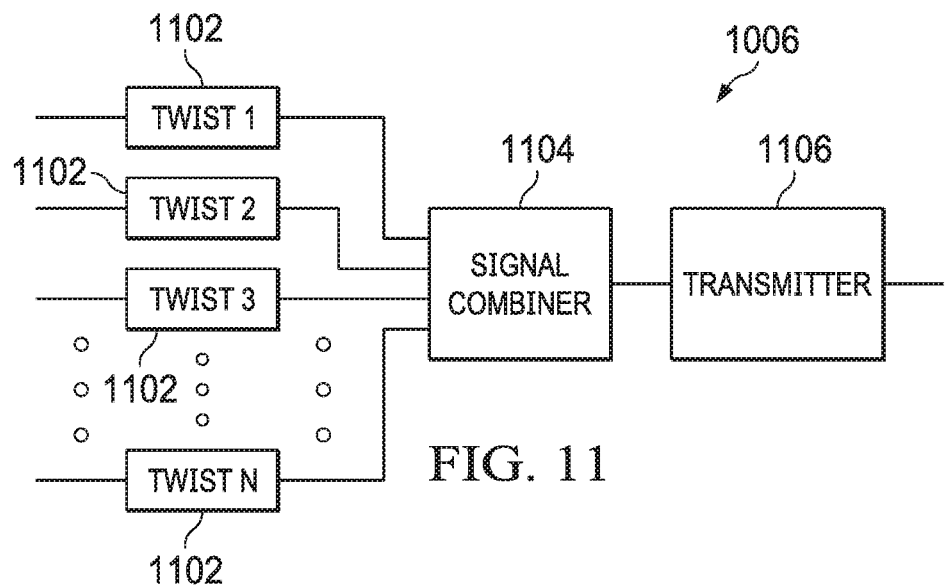
FIG. 11 is a functional block diagram of the orbital angular momentum signal processing block of FIG. 10.

Referring now to FIG. 11, there is provided a more detailed functional description of the OAM signal processing block 1006. Each of the input data streams are provided to OAM circuitry 1102. Each of the OAM circuitry 1102 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1102 are unique to the data stream that is provided thereto. An infinite number of orbital angular momentums may be applied to different input data streams using many different currents. Each of the separately generated data streams are provided to a signal combiner 1104, which combines the signals onto a wavelength for transmission from the transmitter 1106.

Figure 12:
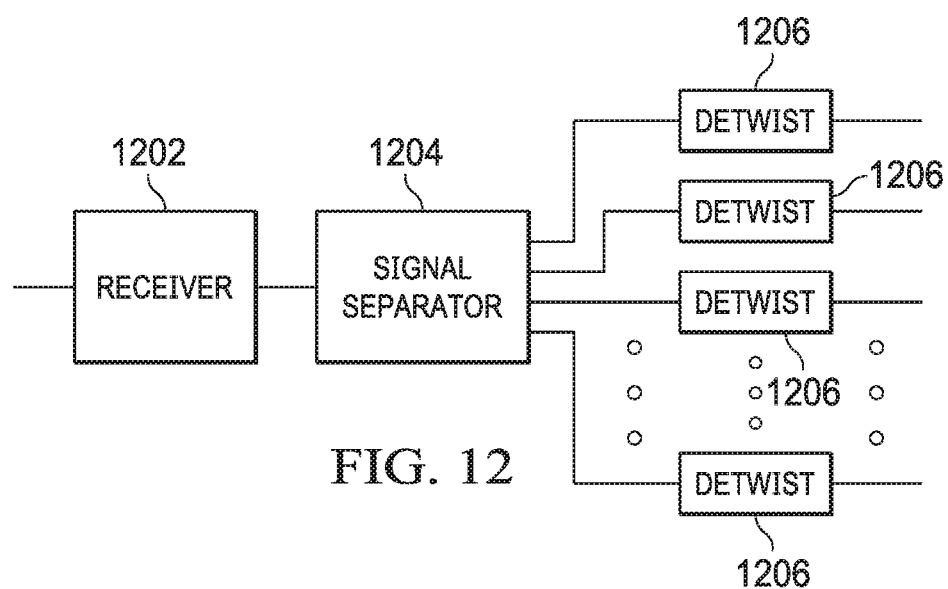
FIG. 12 is a functional block diagram illustrating the manner for removing orbital angular momentum from a received signal including a plurality of data streams.

Referring now to FIG. 12, there is illustrated the manner in which the OAM processing circuitry 606 may separate a received signal into multiple data streams. The receiver 1202 receives the combined OAM signals on a single wavelength and provides this information to a signal separator 1204. The signal separator 1204 separates each of the signals having different orbital angular momentums from the received wavelength and provides the separated signals to OAM de-twisting circuitry 1206. The OAM de-twisting circuitry 1206 removes the associated OAM twist from each of the associated signals and provides the received modulated data stream for further processing. The signal separator 1204 separates each of the received signals that have had the orbital angular momentum removed therefrom into individual received signals. The individually received signals are provided to the receiver 1202 for demodulation using, for example, multiple level overlay demodulation as will be more fully described herein below.

Figure 13:
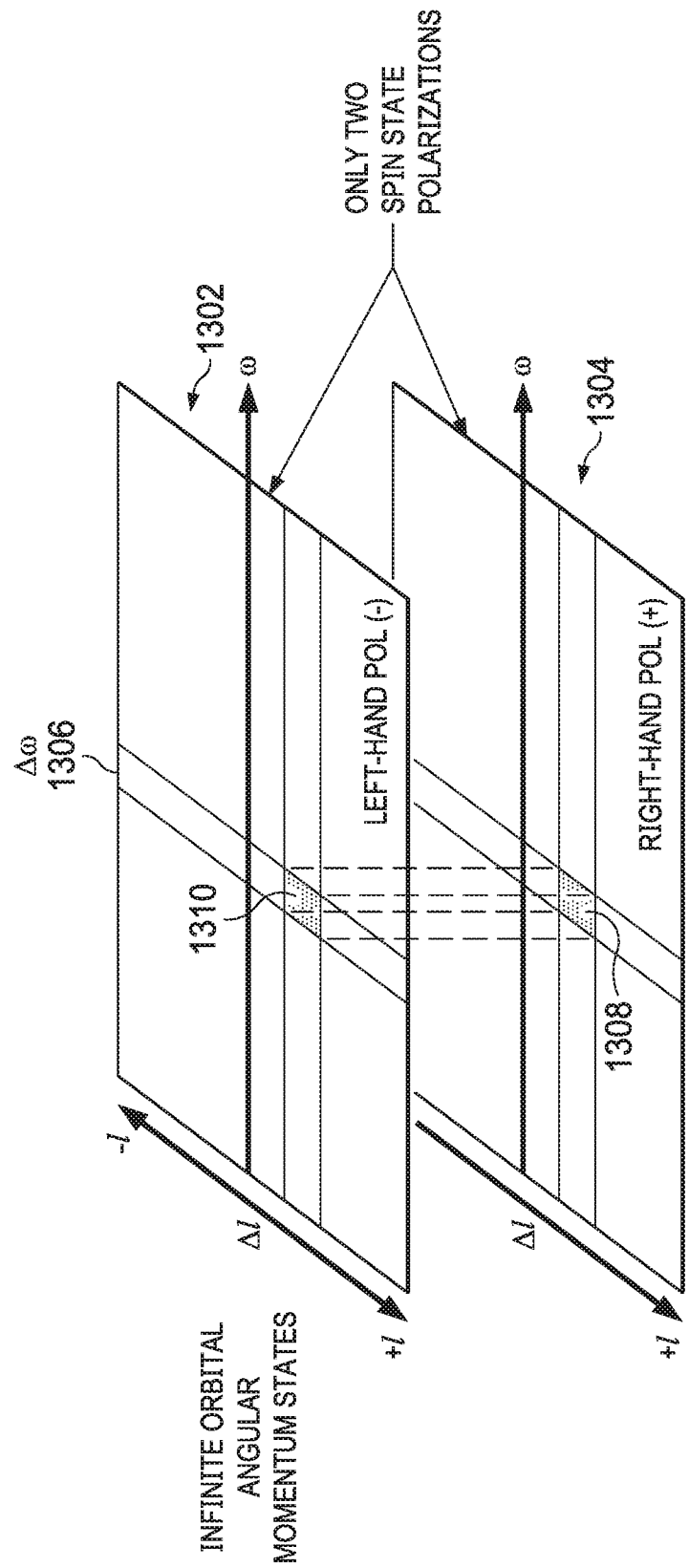
FIG. 13 illustrates a single wavelength having two quanti-spin polarizations providing an infinite number of signals having various orbital angular momentums associated therewith.

FIG. 13 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (w) represents the various frequencies to which the signals of differing orbital angular momentum may be applied. The top grid 1302 represents the potentially available signals for a left handed signal polarization, while the bottom grid 1304 is for potentially available signals having right handed polarization.

By applying different orbital angular momentum states to a signal at a particular frequency or wavelength, a potentially infinite number of states may be provided at the frequency or wavelength. Thus, the state at the frequency $\Delta\omega$ or wavelength 1306 in both the left handed polarization plane 1302 and the right handed polarization plane 1304 can provide an infinite number of signals at different orbital angular momentum states $\Delta l$. Blocks 1308 and 1310 represent a particular signal having an orbital angular momentum $\Delta l$ at a frequency $\Delta\omega$ or wavelength in both the right handed polarization plane 1304 and left handed polarization plane 1310, respectively. By changing to a different orbital angular momentum within the same frequency $\Delta\omega$ or wavelength 1306, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 13, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotonic states (the Aμ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning.

The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3x (|E|^2 + c^2|B|^2) \text{ Hamiltonian (total energy)}$$

$$\frac{dU^{mech}}{dt} + \frac{dU^{em}}{dt} + \oint_{s'} d^2x' \hat{n}' \cdot S = 0 \text{ conversation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3x (E \times B) \text{ linear momentum}$$

$$\frac{dp^{mech}}{dt} + \frac{dp^{em}}{dt} + \oint_{s'} d^2x' \hat{n}' \cdot T = 0 \text{ conservation of linear momentum}$$

The conservation of system center of energy is represented by the equation:

$$R = \frac{1}{H} \sum_i (x_i - x_0) m_i \gamma_i c^2 + \frac{\varepsilon_0}{2H} \int d^3x (x - x_0)(|E^2| + c^2|B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2x' \hat{n}' \cdot M = 0 \text{ conservation of angular momentum}$$

For radiation beams in free space, the EM field angular momentum Yin can be separated into two parts:

$$J^{em} = \varepsilon_0 \int_{V'} d^3x' (E \times A) + \varepsilon_0 \int_{V'} d^3x' E_i[(x' - x_0) \times \nabla] A_i$$

For each singular Fourier mode in real valued representation:

$$J^{em} = -i\frac{\varepsilon_0}{2\omega} \int_{V'} d^3x' (E^* \times E) - i\frac{\varepsilon_0}{2\omega} \int_{V'} d^3x' E_i[(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0, \text{ continuity equation}$$

where S is the Poynting vector $$S = \frac{1}{4}(E \times H^* + E^* \times H),$$

and U is the energy density $$U = \frac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon|E|^2 + \mu_0|H|^2} \right)$$

Figure 14A:
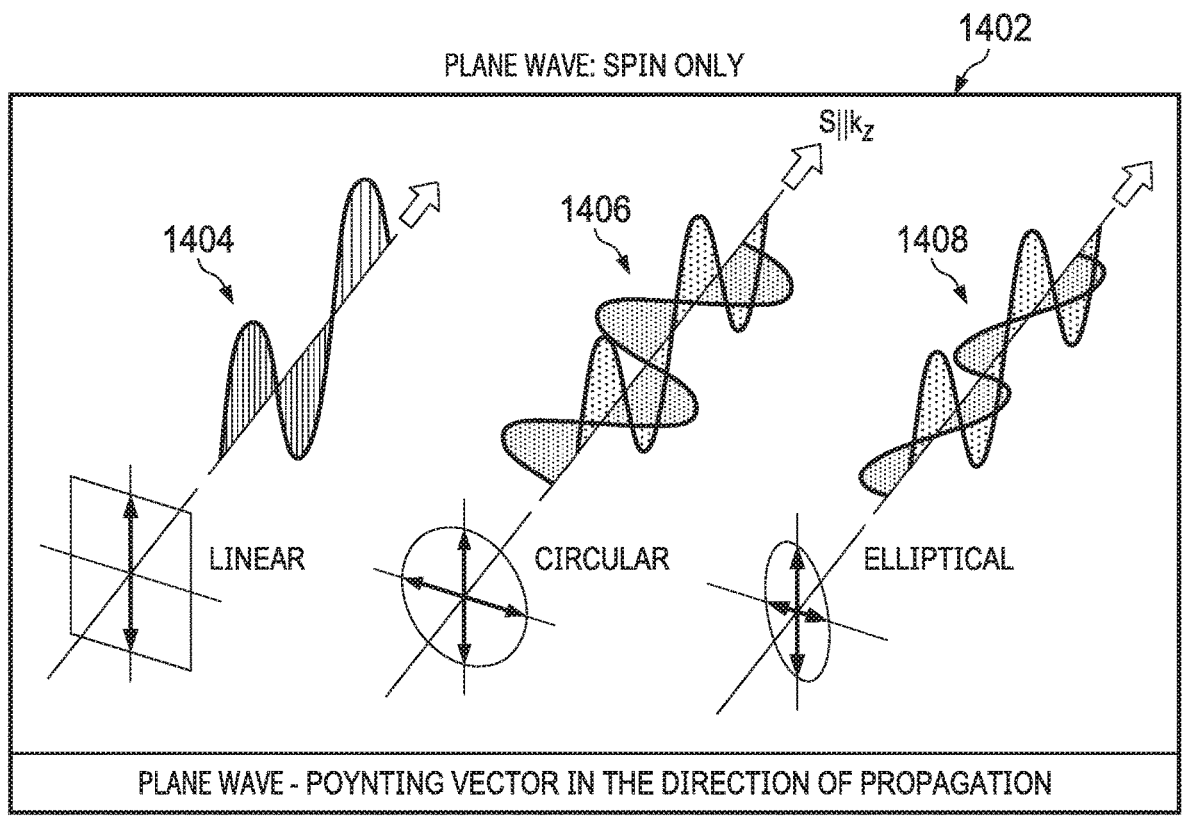
FIG. 14A illustrates a plane wave having only variations in the spin angular momentum.
Figure 14B:
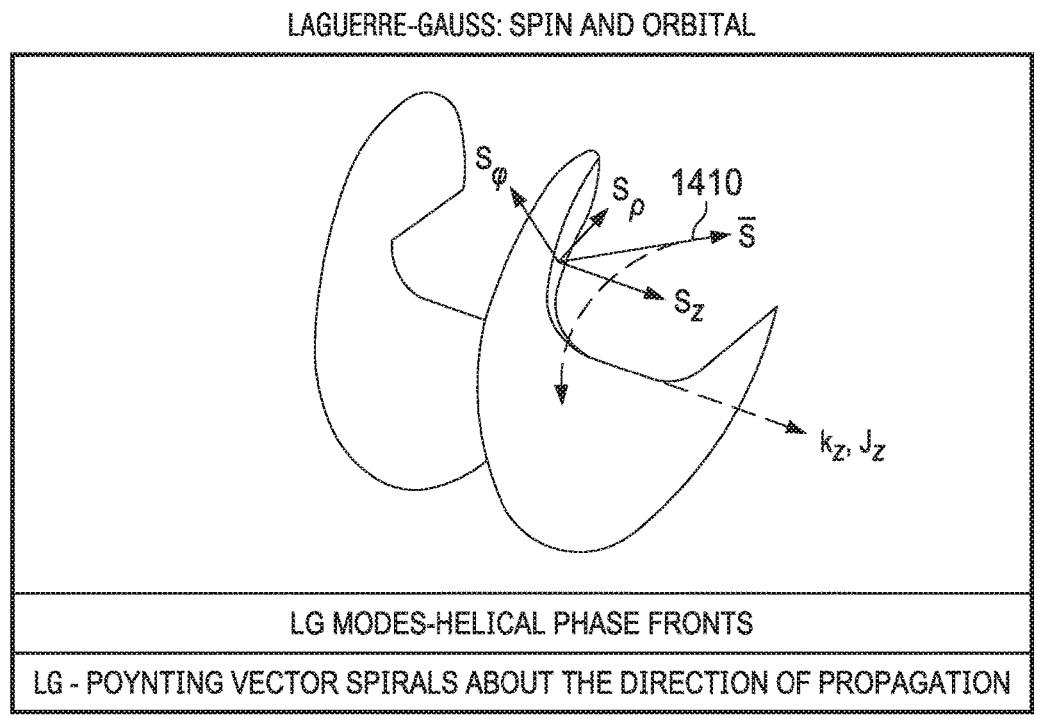
FIG. 14B illustrates a signal having both spin and orbital angular momentum applied thereto.

Referring now to FIGS. 14A and 14B, there is illustrated the manner in which a signal and its associated Poynting vector in a plane wave situation. In the plane wave situation illustrated generally at 1402, the transmitted signal may take one of three configurations. When the electric field vectors are in the same direction, a linear signal is provided, as illustrated generally at 1404. Within a circular polarization 1406, the electric field vectors rotate with the same magnitude. Within the elliptical polarization 1408, the electric field vectors rotate but have differing magnitudes. The Poynting vector remains in a constant direction for the signal configuration to FIG. 14A and always perpendicular to the electric and magnetic fields. Referring now to FIG. 14B, when a unique orbital angular momentum is applied to a signal as described here and above, the Poynting vector S 1410 will spiral about the direction of propagation of the signal. This spiral may be varied in order to enable signals to be transmitted on the same frequency as described herein.

Figure 15A:
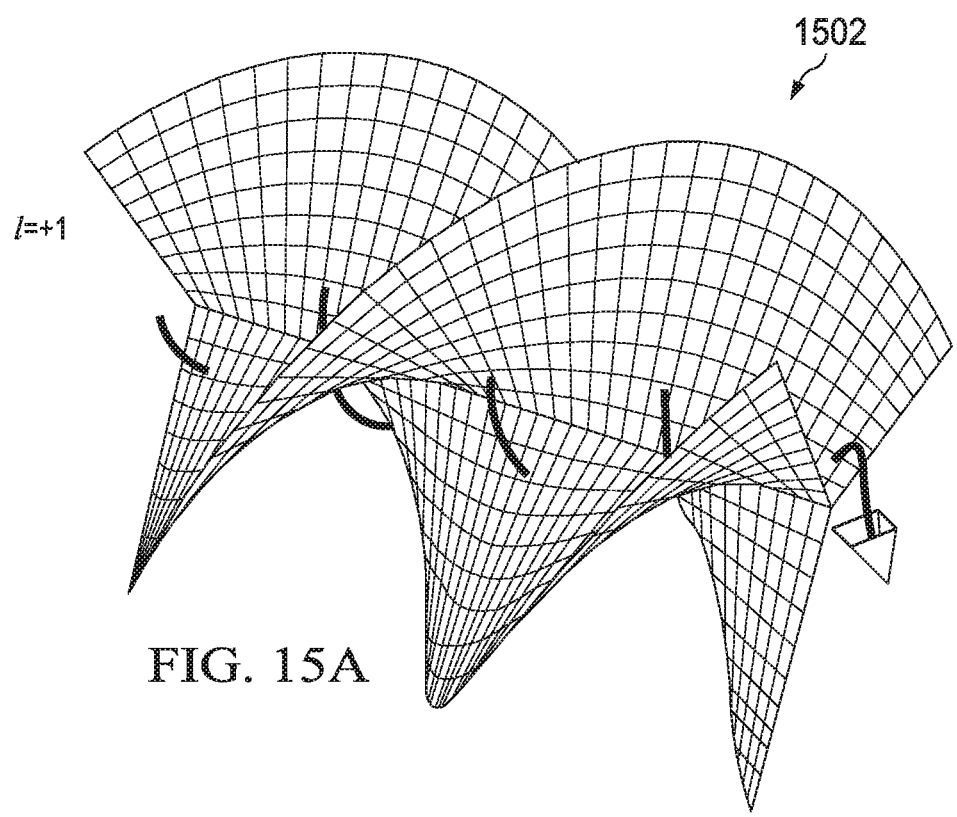
FIGS. 15A-15C illustrate various signals having different orbital angular momentum applied thereto.
Figure 15B:
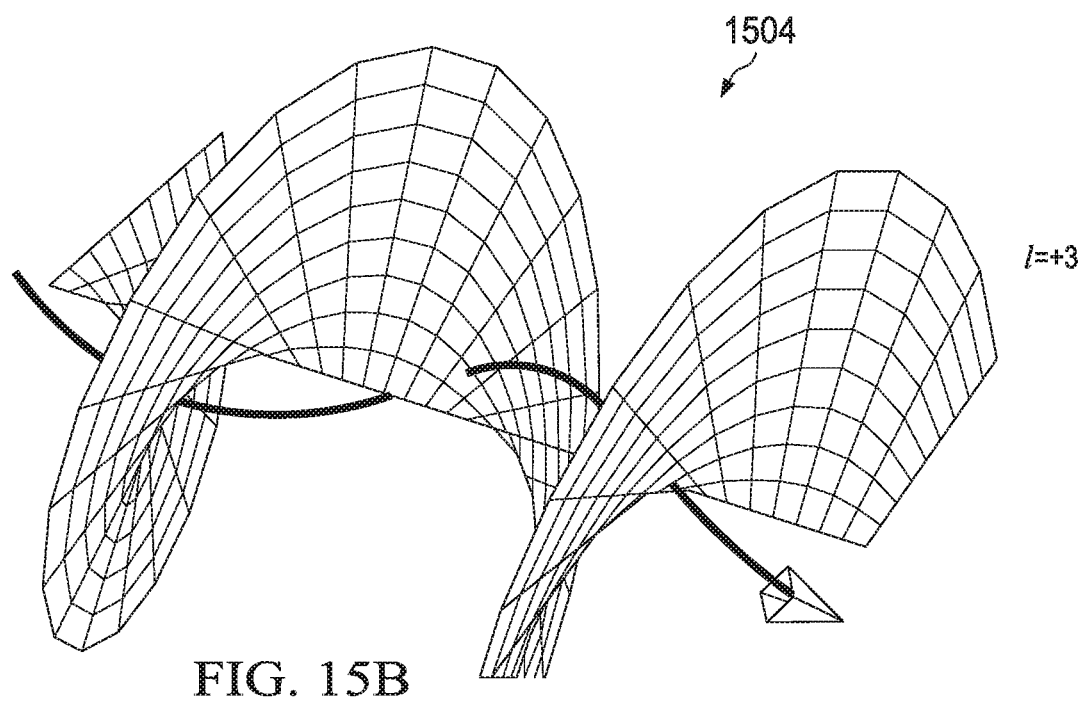
Figure 15C:
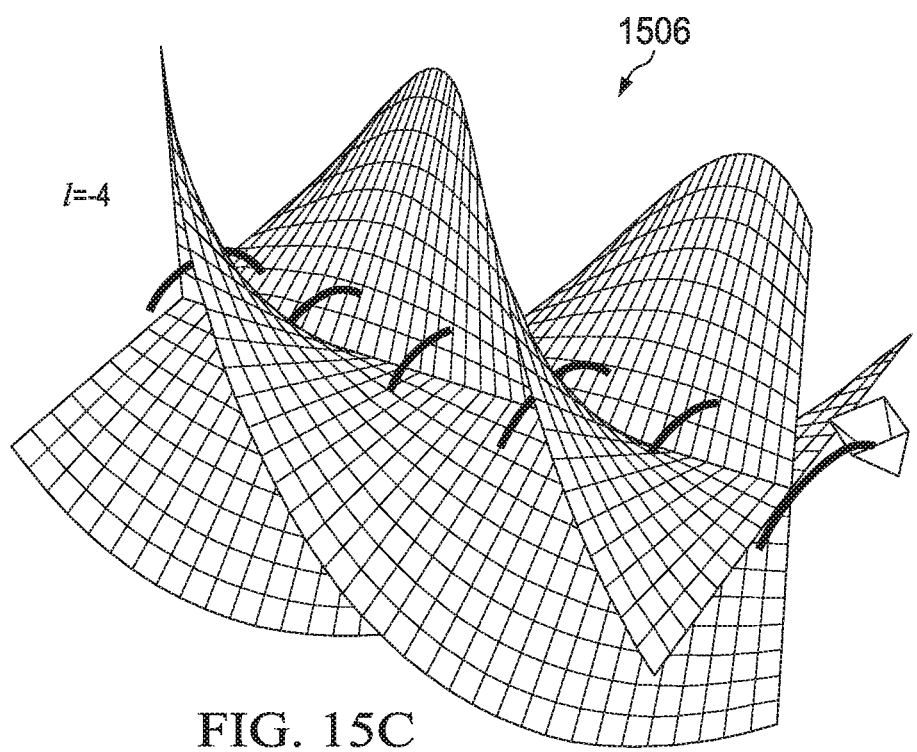

FIGS. 15A through 15C illustrate the differences in signals having different helicity (i.e., orbital angular momentums). Each of the spiraling Poynting vectors associated with the signals 1502, 1504, and 1506 provide a different shaped signal. Signal 1502 has an orbital angular momentum of +1, signal 1504 has an orbital angular momentum of +3, and signal 1506 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 15D:
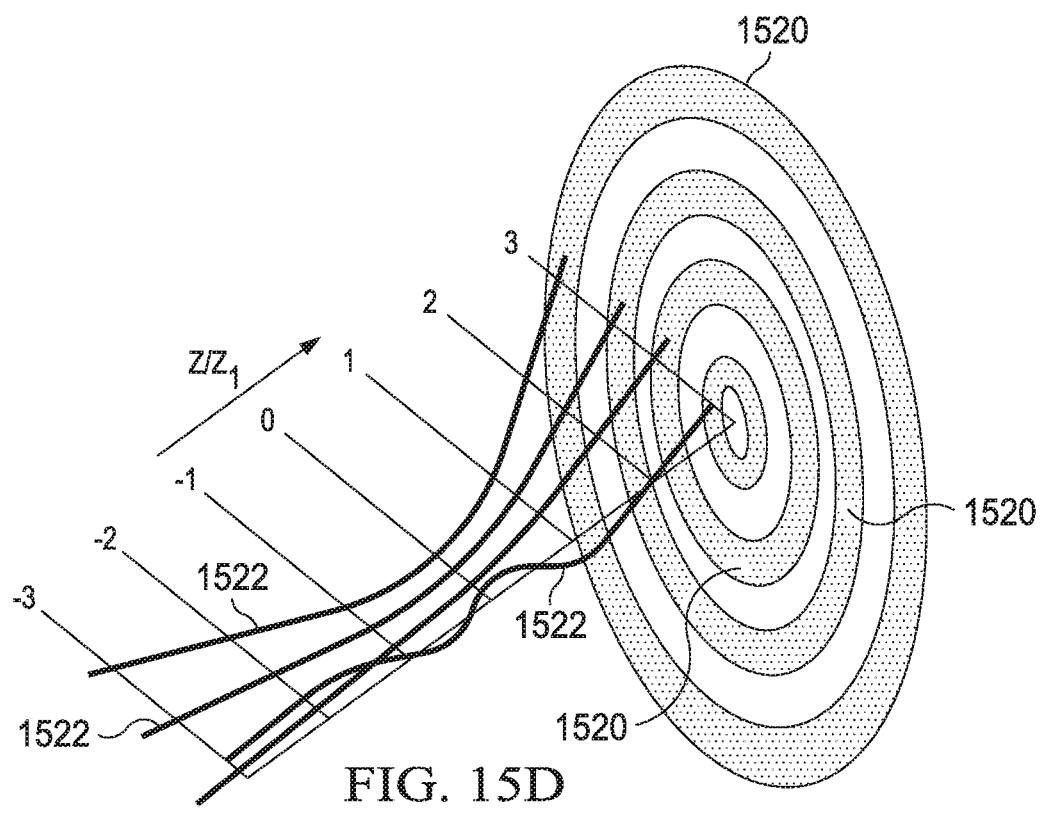
FIG. 15D illustrates a propagation of Poynting vectors for various Eigen modes.

FIG. 15D illustrates the propagation of Poynting vectors for various Eigen modes. Each of the rings 1520 represents a different Eigen mode or twist representing a different orbital angular momentum within the same frequency. Each of these rings 1520 represents a different orthogonal channel. Each of the Eigen modes has a Poynting vector 1522 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. The helicity index may be positive or negative. In RF, different topological charges can be created and muxed together and de-muxed to separate the topological charges.

Figure 15E:
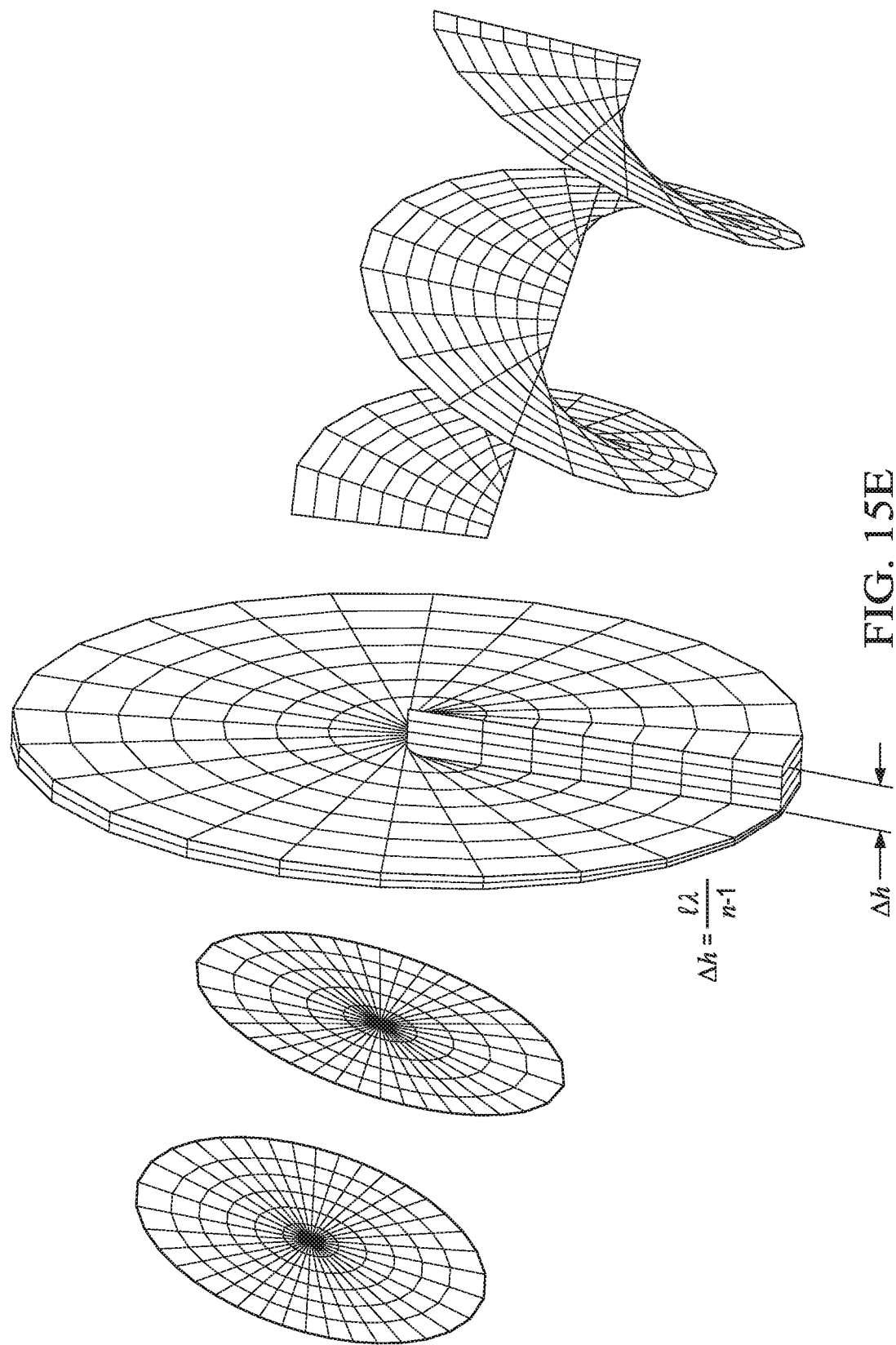
FIG. 15E illustrates a spiral phase plate.

The topological charges $\ell$ s can be created using Spiral Phase Plates (SPPs) as shown in FIG. 15E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave ($\ell$=0) to a twisted RF wave of a specific helicity (i.e. $\ell$=+1).

Quantum Key Distribution

Figure 16:
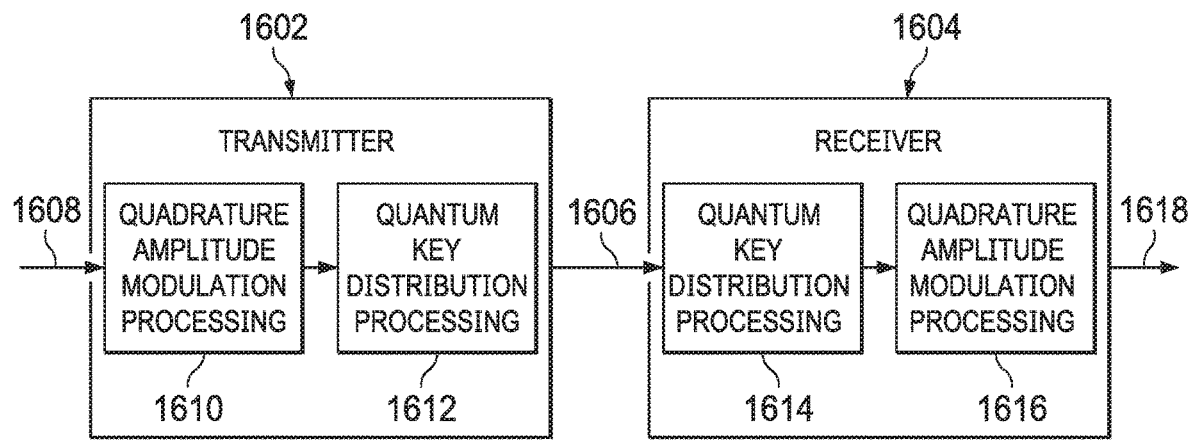
FIG. 16 illustrates a block diagram of an OAM processing system utilizing quantum key distribution.

The manner for implementation of Quantum Key Distribution (QKD) using OAM that is used within a blockchain will now be more fully described. Referring now to FIG. 16, there is illustrated a further improvement of a system utilizing orbital angular momentum processing with QKD. In the illustration of FIG. 16, a transmitter 1602 and receiver 1604 are interconnected over an optical or RF link 1606. Alternatively, a hashing function and dehashing function may be connected by a link, the link 1606 may comprise a fiber-optic link or a free-space optic link as described herein above. The transmitter receives a data stream 1608 that is processed via orbital angular momentum processing circuitry 1610. The data streams may comprise any group of data that is to become part of the blockchain. The orbital angular momentum processing circuitry 1610 provide orbital angular momentum twist to the received data. In some embodiments, the orbital angular momentum processing circuitry may further provide multi-layer overlay modulation to the signal channels in order to further increase system bandwidth.

The OAM processed signals are provided to quantum key distribution processing circuitry 1612. The quantum key distribution processing circuitry 1612 utilizes the principals of quantum key distribution as will be more fully described herein below to enable encryption of the signal being transmitted over the optical link 1606 to the receiver 1604 or within a hash function as described herein. The received signals are processed within the receiver 1604 using the quantum key distribution processing circuitry 1614. The quantum key distribution processing circuitry 1614 decrypts the received signals using the quantum key distribution processing as will be more fully described herein below. The decrypted signals are provided to orbital angular momentum processing circuitry 1616 which removes any orbital angular momentum twist from the signals to generate the plurality of output signals 1618. As mentioned previously, the orbital angular momentum processing circuitry 1616 may also demodulate the signals using multilayer overlay modulation included within the received signals.

Orbital angular momentum in combination with optical polarization is exploited within the circuit of FIG. 16 in order to encode information in rotation invariant photonic states, so as to guarantee full independence of the communication from the local reference frames of the transmitting unit 1602 and the receiving unit 1604. There are various ways to implement quantum key distribution (QKD), a protocol that exploits the features of quantum mechanics to guarantee unconditional security in cryptographic communications with error rate performances that are fully compatible with real world application environments or cryptographic hashes.

Encrypted communication or encrypted hash requires the exchange of keys in a protected manner. This key exchange is often done through a trusted authority. Quantum key distribution is an alternative solution to the key establishment problem. In contrast to, for example, public key cryptography, quantum key distribution has been proven to be unconditionally secure, i.e., secure against any attack, even in the future, irrespective of the computing power or in any other resources that may be used. Quantum key distribution security relies on the laws of quantum mechanics, and more specifically on the fact that it is impossible to gain information about non-orthogonal quantum states without perturbing these states. This property can be used to establish random keys between a transmitter and receiver, and encryptor and decryptor, and guarantee that the key is perfectly secret from any third party eavesdropping on the line.

Figure 17:
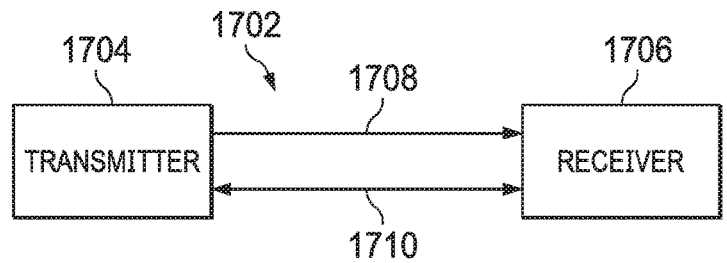
FIG. 17 illustrates a basic quantum key distribution system.

In parallel to the "full quantum proofs" mentioned above, the security of QKD systems has been put on stable information theoretic footing, thanks to the work on secret key agreements done in the framework of information theoretic cryptography and to its extensions, triggered by the new possibilities offered by quantum information. Referring now to FIG. 17, within a basic QKD system, a QKD link 1702 is a point to point connection between a transmitter 1704 and a receiver 1706 (encryptor and decryptor) that want to share secret keys. The QKD link 1702 is constituted by the combination of a quantum channel 1708 and a classic channel 1710. The transmitter 1704 generates a random stream of classical bits and encodes them into a sequence of non-orthogonal states of light that are transmitted over the quantum channel 1708. Upon reception of these quantum states, the receiver 1706 performs some appropriate measurements leading the receiver to share some classical data over the classical link 1710 correlated with the transmitter bit stream. The classical channel 1710 is used to test these correlations.

If the correlations are high enough, this statistically implies that no significant eavesdropping has occurred on the quantum channel 1708 and thus, that has a very high probability, a perfectly secure, symmetric key can be distilled from the correlated data shared by the transmitter 1704 and the receiver 1706. In the opposite case, the key generation process has to be aborted and started again. The quantum key distribution is a symmetric key distribution technique. Quantum key distribution requires, for authentication purposes, that the transmitter 1704 and receiver 1706 share in advance a short key whose length scales only logarithmically in the length of the secret key generated by an OKD session.

Quantum key distribution on a regional scale has already been demonstrated in a number of countries. However, free-space optical links are required for long distance communication among areas which are not suitable for fiber installation or for moving terminals, including the important case of satellite based links. The present approach exploits spatial transverse modes of the optical beam, in particular of the OAM degree of freedom, in order to acquire a significant technical advantage that is the insensitivity of the communication to relevant alignment of the user's reference frames. However, the techniques may be used in other types of links. This advantage may be very relevant for quantum key distribution implementation to be upgraded from the regional scale to a national or continental one, or for links crossing hostile ground, and even for envisioning a quantum key distribution on a global scale by exploiting orbiting terminals on a network of satellites.

The OAM Eigen modes are characterized by a twisted wavefront composed of "l" intertwined helices, where "l" is an integer, and by photons carrying "+lh" of (orbital) angular momentum, in addition to the more usual spin angular momentum (SAM) associated with polarization. The potentially unlimited value of "l" opens the possibility to exploit OAM also for increasing the capacity of communication systems (although at the expense of increasing also the channel cross-section size), and terabit classical data transmission based on OAM multiplexing can be demonstrated both in free-space and optical fibers. Such a feature can also be exploited in the quantum domain, for example to expand the number of qubits per photon, or to achieve new functions, such as the rotational invariance of the qubits or an encryptor and a decryptor.

In a free-space QKD, two users (Alice and Bob) must establish a shared reference frame (SRF) in order to communicate with good fidelity. Indeed the lack of a SRF is equivalent to an unknown relative rotation which introduces noise into the quantum channel, disrupting the communication. When the information is encoded in photon polarization, such a reference frame can be defined by the orientations of Alice's and Bob's "horizontal" linear polarization directions. The alignment of these directions needs extra resources and can impose serious obstacles in long distance free space QKD and/or when the misalignment varies in time. As indicated, we can solve this by using rotation invariant states, which remove altogether the need for establishing a SRF. Such states are obtained as a particular combination of OAM and polarization modes (hybrid states), for which the transformation induced by the misalignment on polarization is exactly balanced by the effect of the same misalignment on spatial modes. These states exhibit a global symmetry under rotations of the beam around its axis and can be visualized as space-variant polarization states, generalizing the well-known azimuthal and radial vector beams, and forming a two-dimensional Hilbert space. Moreover, this rotation-invariant hybrid space can be also regarded as a decoherence-free subspace of the four-dimensional OAM-polarization product Hilbert space, insensitive to the noise associated with random rotations.

The hybrid states can be generated by a particular space-variant birefringent plate having topological charge "q" at its center, named "q-plate". In particular, a polarized Gaussian beam (having zero OAM) passing through a q-plate with q=½ will undergo the following transformation:

$$(\alpha|R\rangle + \beta|R\rangle)_{\pi \neq} |0\rangle_o \rightarrow \alpha|L\rangle_{\pi} \oplus |r\rangle_o + \beta|R\rangle_{\pi} \oplus |l\rangle_o$$

$|L\rangle_{\pi_-}$ and $|R\rangle_{\pi}$ denote the left and right circular polarization states (eigenstates of SAM with eigenvalues "±h"), $|0\rangle_o$ represents the transverse Gaussian mode with zero OAM and the $|L\rangle_{o_-}$ and $|R\rangle_o$ eigenstates of OAM with |l|=1 and with eigenvalues "+±lh"). The states appearing on the right hand side of equation are rotation-invariant states. The reverse operation to this can be realized by a second q-plate with the same q. In practice, the q-plate operates as an interface between the polarization space and the hybrid one, converting qubits from one space to the other and vice versa in a universal (qubit invariant) way. This in turn means that the initial encoding and final decoding of information in our QKD implementation protocol can be conveniently performed in the polarization space, while the transmission is done in the rotation-invariant hybrid space.

OAM is a conserved quantity for light propagation in vacuum, which is obviously important for communication applications. However, OAM is also highly sensitive to atmospheric turbulence, a feature which limits its potential usefulness in many practical cases unless new techniques are developed to deal with such issues.

Quantum cryptography describes the use of quantum mechanical effects (in particular quantum communication and quantum computation) to perform cryptographic tasks or to break cryptographic systems. Well-known examples of quantum cryptography are the use of quantum communication to exchange a key securely (quantum key distribution) and the hypothetical use of quantum computers that would allow the breaking of various popular public-key encryption and signature schemes (e.g., RSA).

The advantage of quantum cryptography lies in the fact that it allows the completion of various cryptographic tasks that are proven to be impossible using only classical (i.e. non-quantum) communication. For example, quantum mechanics guarantees that measuring quantum data disturbs that data; this can be used to detect eavesdropping in quantum key distribution.

Quantum key distribution (QKD) uses quantum mechanics to guarantee secure communication. It enables two parties to produce a shared random secret key known only to them, which can then be used to encrypt and decrypt messages.

An important and unique property of quantum distribution is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. By using quantum superposition or quantum entanglement and transmitting information in quantum states, a communication system can be implemented which detects eavesdropping. If the level of eavesdropping is below a certain threshold, a key can be produced that is guaranteed to be secure (i.e. the eavesdropper has no information about it), otherwise no secure key is possible and communication is aborted or validation of a hash not provided.

The security of quantum key distribution relies on the foundations of quantum mechanics, in contrast to traditional key distribution protocol which relies on the computational difficulty of certain mathematical functions, and cannot provide any indication of eavesdropping or guarantee of key security.

Quantum key distribution is only used to reduce and distribute a key, not to transmit any message data. This key can then be used with any chosen encryption algorithm to encrypt (and decrypt) a message, which is transmitted over a standard communications channel. The algorithm most commonly associated with QKD is the one-time pad, as it is provably secure when used with a secret, random key.

Quantum communication involves encoding information in quantum states, or qubits, as opposed to classical communication's use of bits. Usually, photons are used for these quantum states and thus is applicable within optical communication systems. Quantum key distribution exploits certain properties of these quantum states to ensure its security. There are several approaches to quantum key distribution, but they can be divided into two main categories, depending on which property they exploit. The first of these are prepare and measure protocol. In contrast to classical physics, the act of measurement is an integral part of quantum mechanics. In general, measuring an unknown quantum state changes that state in some way. This is known as quantum indeterminacy, and underlies results such as the Heisenberg uncertainty principle, information distribution theorem, and no cloning theorem. This can be exploited in order to detect any eavesdropping on communication (which necessarily involves measurement) and, more importantly, to calculate the amount of information that has been intercepted. Thus, by detecting the change within the signal, the amount of eavesdropping or information that has been intercepted may be determined by the receiving party.

The second category involves the use of entanglement based protocols. The quantum states of two or more separate objects can become linked together in such a way that they must be described by a combined quantum state, not as individual objects. This is known as entanglement, and means that, for example, performing a measurement on one object affects the other object. If an entanglement pair of objects is shared between two parties, anyone intercepting either object alters the overall system, revealing the presence of a third party (and the amount of information that they have gained). Thus, again, undesired reception of information may be determined by change in the entangled pair of objects that is shared between the parties when intercepted by an unauthorized third party.

One example of a quantum key distribution (QKD) protocol is the BB84 protocol. The BB84 protocol was originally described using photon polarization states to transmit information. However, any two pairs of conjugate states can be used for the protocol, and optical fiber-based implementations described as BB84 can use phase-encoded states. The transmitter (traditionally referred to as Alice) and the receiver (traditionally referred to as Bob) are connected by a quantum communication channel which allows quantum states to be transmitted. In the case of photons, this channel is generally either an optical fiber, or simply free-space, as described previously with respect to FIG. 16. In addition, the transmitter and receiver communicate via a public classical channel, for example using broadcast radio or the Internet. Neither of these channels needs to be secure. The protocol is designed with the assumption that an eavesdropper (referred to as Eve) can interfere in any way with both the transmitter and receiver.

Figure 18:
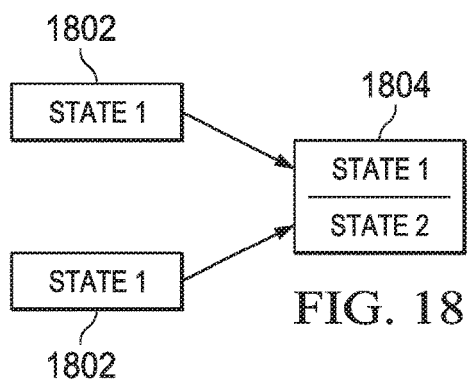
FIG. 18 illustrates the manner in which two separate states are combined into a single conjugate pair within quantum key distribution.
Figure 19:
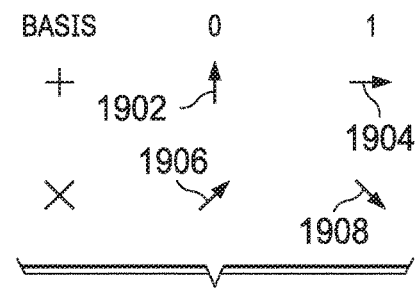
FIG. 19 illustrates one manner in which 0 and 1 bits may be transmitted using different basis within a quantum key distribution system.

Referring now to FIG. 18, the security of the protocol comes from encoding the information in non-orthogonal states. Quantum indeterminacy means that these states cannot generally be measured without disturbing the original state. BB84 uses two pair of states 1802, each pair conjugate to the other pair to form a conjugate pair 1804. The two states 1802 within a pair 1804 are orthogonal to each other. Pairs of orthogonal states are referred to as a basis. The usual polarization state pairs used are either the rectilinear basis of vertical (0 degrees) and horizontal (90 degrees), the diagonal basis of 45 degrees and 135 degrees, or the circular basis of left handedness and/or right handedness. Any two of these basis are conjugate to each other, and so any two can be used in the protocol. In the example of FIG. 19, rectilinear basis are used at 1902 and 1904, respectively, and diagonal basis are used at 1906 and 1908.

The first step in BB84 protocol is quantum transmission. Referring now to FIG. 20 wherein there is illustrated a flow diagram describing the process, wherein the transmitter creates a random bit (0 or 1) at step 2002, and randomly selects at 2004 one of the two basis, either rectilinear or diagonal, to transmit the random bit. The transmitter prepares at step 2006 a photon polarization state depending both on the bit value and the selected basis, as shown in FIG. 18. So, for example, a 0 is encoded in the rectilinear basis (+) as a vertical polarization state and a 1 is encoded in a diagonal basis (X) as a 135 degree state. The transmitter transmits at step 2008 a single proton in the state specified to the receiver using the quantum channel. This process is repeated from the random bit stage at step 2002 with the transmitter recording the state, basis, and time of each photon that is sent over the optical link.

According to quantum mechanics, no possible measurement distinguishes between the four different polarization states 1902 through 1908 of FIG. 19, as they are not all orthogonal. The only possible measurement is between any two orthogonal states (and orthonormal basis). So, for example, measuring in the rectilinear basis gives a result of horizontal or vertical. If the photo was created as horizontal or vertical (as a rectilinear eigenstate), then this measures the correct state, but if it was created as 45 degrees or 135 degrees (diagonal eigenstate), the rectilinear measurement instead returns either horizontal or vertical at random. Furthermore, after this measurement, the proton is polarized in the state it was measured in (horizontal or vertical), with all of the information about its initial polarization lost.

Referring now to FIG. 21, as the receiver does not know the basis the photons were encoded in, the receiver can only select a basis at random to measure in, either rectilinear or diagonal. At step 2102, the transmitter does this for each received photon, recording the time measurement basis used and measurement result at step 2104. At step 2106, a determination is made if there are further protons present and, if so, control passes back to step 2102. Once inquiry step 2106 determines the receiver had measured all of the protons, the transceiver communicates at step 2108 with the transmitter over the public communications channel. The transmitter broadcast the basis for each photon that was sent at step 2110 and the receiver broadcasts the basis each photon was measured in at step 2112. Each of the transmitter and receiver discard photon measurements where the receiver used a different basis at step 2114 which, on average, is one-half, leaving half of the bits as a shared key, at step 2116. This process is more fully illustrated in FIG. 22.

The transmitter transmits the random bit 01101001. For each of these bits respectively, the transmitter selects the sending basis of rectilinear, rectilinear, diagonal, rectilinear, diagonal, diagonal, diagonal, and rectilinear. Thus, based upon the associated random bits selected and the random sending basis associated with the signal, the polarization indicated in line 2102 is provided. Upon receiving the photon, the receiver selects the random measuring basis as indicated in line 2204. The photon polarization measurements from these basis will then be as indicated in line 2206. A public discussion of the transmitted basis and the measurement basis are discussed at 2208 and the secret key is determined to be 0101 at 2210 based upon the matching bases for transmitted photons 1, 3, 6, and 8.

Figure 23:
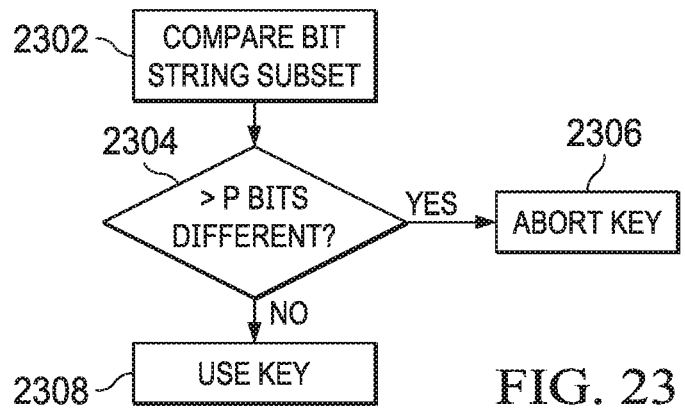
FIG. 23 is a flow diagram illustrating the process for determining whether to keep or abort a determined key.

Referring now to FIG. 23, there is illustrated the process for determining whether to keep or abort the determined key based upon errors detected within the determined bit string. To check for the presence of eavesdropping, the transmitter and receiver compare a certain subset of their remaining bit strings at step 2302. If a third party has gained any information about the photon's polarization, this introduces errors within the receiver's measurements. If more than P bits differ at inquiry step 2304, the key is aborted at step 2306, and the transmitter and receiver try again, possibly with a different quantum channel, as the security of the key cannot be guaranteed. P is chosen so that if the number of bits that is known to the eavesdropper is less than this, privacy amplification can be used to reduce the eavesdropper's knowledge of the key to an arbitrarily small amount by reducing the length of the key. If inquiry step 2304 determines that the number of bits is not greater than P, then the key may be used at step 2308.

The E91 protocol comprises another quantum key distribution scheme that uses entangled pairs of protons. The entangled pairs can be created by the transmitter, by the receiver, or by some other source separate from both of the transmitter and receiver, including an eavesdropper. The photons are distributed so that the transmitter and receiver each end up with one photon from each pair. The scheme relies on two properties of entanglement. First, the entangled states are perfectly correlated in the sense that if the transmitter and receiver both measure whether their particles have vertical or horizontal polarizations, they always get the same answer with 100 percent probability. The same is true if they both measure any other pair of complementary (orthogonal) polarizations. However, the particular results are not completely random. It is impossible for the transmitter to predict if the transmitter, and thus the receiver, will get vertical polarizations or horizontal polarizations. Second, any attempt at eavesdropping by a third party destroys these correlations in a way that the transmitter and receiver can detect. The original Ekert protocol (E91) consists of three possible states and testing Bell inequality violation for detecting eavesdropping.

Presently, the highest bit rate systems currently using quantum key distribution demonstrate the exchange of secure keys at 1 Megabit per second over a 20 kilometer optical fiber and 10 Kilobits per second over a 100 kilometer fiber.

The longest distance over which quantum key distribution has been demonstrated using optical fiber is 148 kilometers. The distance is long enough for almost all of the spans found in today's fiber-optic networks. The distance record for free-space quantum key distribution is 144 kilometers using BB84 enhanced with decoy states.

Figure 24:
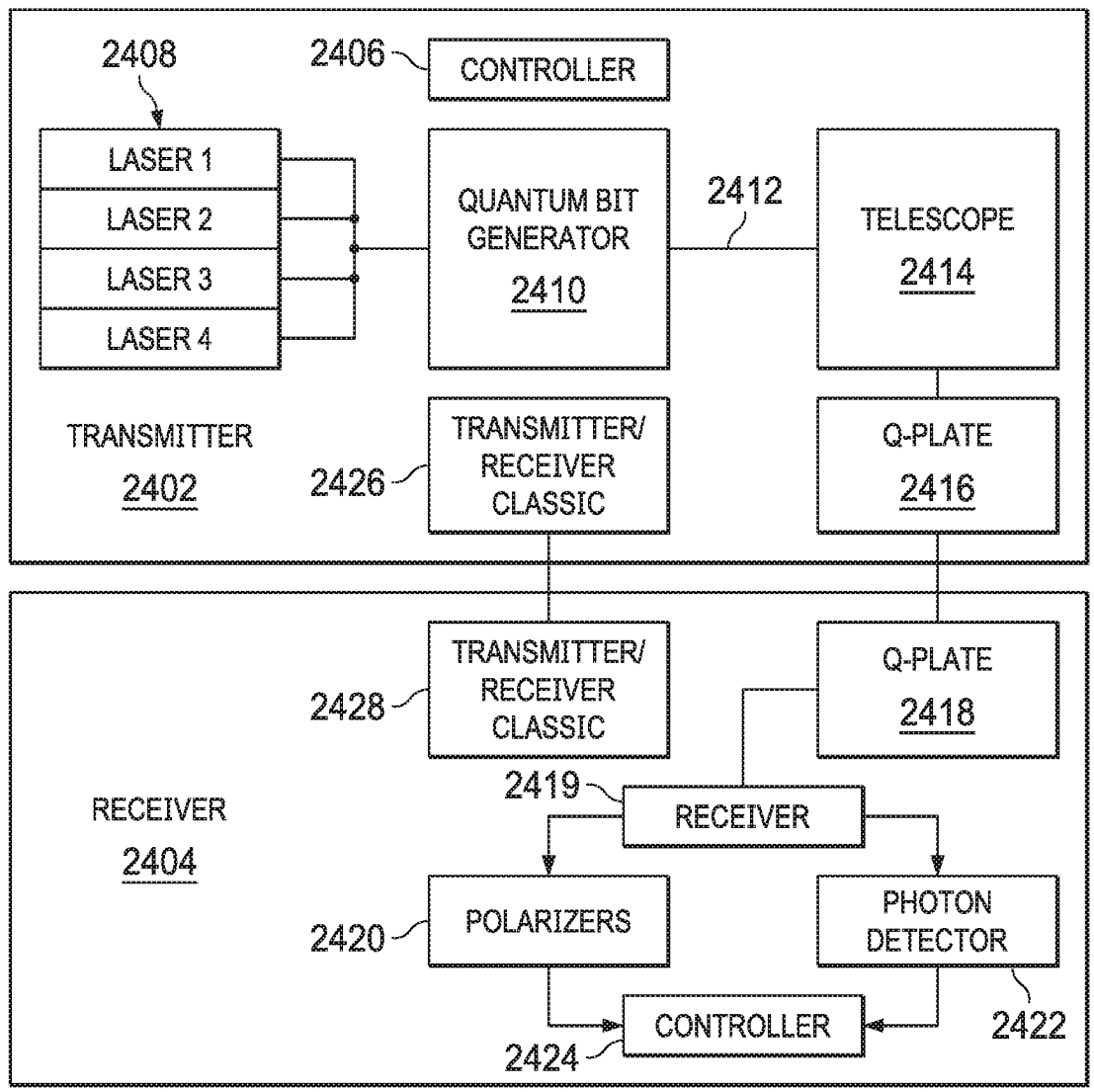
FIG. 24 illustrates a functional block diagram of a transmitter and receiver utilizing a free-space quantum key distribution system.

Referring now to FIG. 24, there is illustrated a functional block diagram of a transmitter 2402 and receiver 2404 that can implement alignment of free-space quantum key distribution. The system can implement the BB84 protocol with decoy states. The controller 2406 enables the bits to be encoded in two mutually unbiased bases $Z=\{|0\rangle, |1\rangle\}$ and $X=\{|+\rangle, |-\rangle\}$, where $|0\rangle$ and $|1\rangle$ are two orthogonal states spanning the qubit space and $|\pm\rangle = 1/\sqrt{2}\,(|0\rangle \pm |1\rangle)$. The transmitter controller 2406 randomly chooses between the Z and X basis to send the classical bits 0 and 1. Within hybrid encoding, the Z basis corresponds to $\{|L\rangle_\pi \oplus |r\rangle_o, |R\rangle_\pi \oplus |l\rangle_o\}$ while the X basis states correspond to $1/\sqrt{2}\,(|L\rangle_\pi \oplus |r\rangle_o \pm |R\rangle_\pi \oplus |l\rangle_o)$. The transmitter 2402 uses four different polarized attenuated lasers 2408 to generate quantum bits through the quantum bit generator 2410. Photons from the quantum bit generator 2410 are delivered via a single mode fiber 2412 to a telescope 2414. Polarization states $|H\rangle, |V\rangle, |R\rangle, |L\rangle$ are transformed into rotation invariant hybrid states by means of a q-plate 2416 with q=½. The photons can then be transmitted to the receiving station 2404 where a second q-plate transform 2418 transforms the signals back into the original polarization states $|H\rangle, |V\rangle, |R\rangle |L\rangle$, as defined by the receiver reference frame. Qubits can then be analyzed by polarizers 2420 and single photon detectors 2422. The information from the polarizers 2420 and photo detectors 2422 may then be provided to the receiver controller 2424 such that the shifted keys can be obtained by keeping only the bits corresponding to the same basis on the transmitter and receiver side as determined by communications over a classic channel between the transceivers 2426, 2428 in the transmitter 2402 and receiver 2404.

Figure 25:
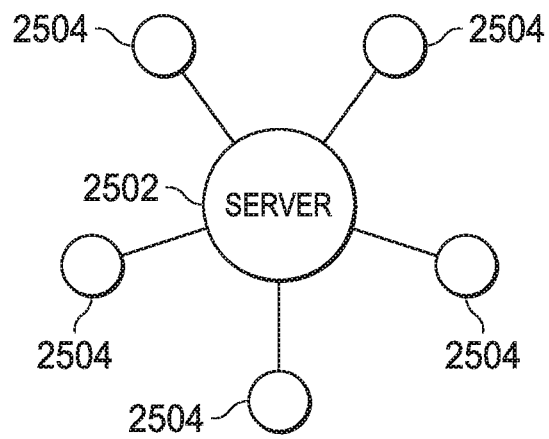
FIG. 25 illustrates a network cloud-based quantum key distribution system.

Referring now to FIG. 25, there is illustrated a network cloud based quantum key distribution system including a central server 2502 and various attached nodes 2504 in a hub and spoke configuration. Trends in networking are presenting new security concerns that are challenging to meet with conventional cryptography, owing to constrained computational resources or the difficulty of providing suitable key management. In principle, quantum cryptography, with its forward security and lightweight computational footprint, could meet these challenges, provided it could evolve from the current point to point architecture to a form compatible with multimode network architecture. Trusted quantum key distribution networks based on a mesh of point to point links lacks scalability, require dedicated optical fibers, are expensive and not amenable to mass production since they only provide one of the cryptographic functions, namely key distribution needed for secure communications. Thus, they have limited practical interest.

A new, scalable approach such as that illustrated in FIG. 25 provides quantum information assurance that is network based quantum communications which can solve new network security challenges. In this approach, a BB84 type quantum communication between each of N client nodes 2504 and a central sever 2502 at the physical layer support a quantum key management layer, which in turn enables secure communication functions (confidentiality, authentication, and nonrepudiation) at the application layer between approximately N2 client pairs. This network based communication "hub and spoke" topology can be implemented in a network setting, and permits a hierarchical trust architecture that allows the server 2502 to act as a trusted authority in cryptographic protocols for quantum authenticated key establishment. This avoids the poor scaling of previous approaches that required a pre-existing trust relationship between every pair of nodes. By making a server 2502, a single multiplex QC(quantum communications) receiver and the client nodes 2504 QC transmitters, this network can simplify complexity across multiple network nodes. In this way, the network based quantum key distribution architecture is scalable in terms of both quantum physical resources and trust. One can at time multiplex the server 2502 with three transmitters 2504 over a single mode fiber, larger number of clients could be accommodated with a combination of temporal and wavelength multiplexing as well as orbital angular momentum multiplexed with wave division multiplexing to support much higher clients.

Figure 26:
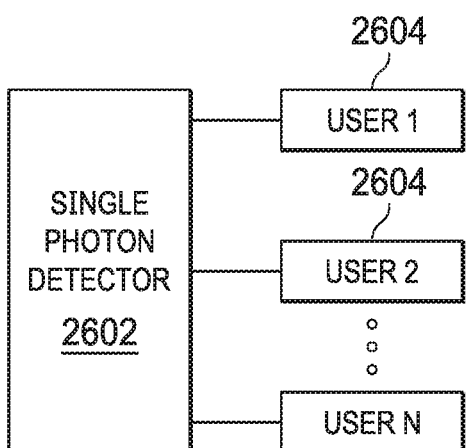
FIG. 26 illustrates a high-speed single photon detector in communication with a plurality of users.
Figure 27:
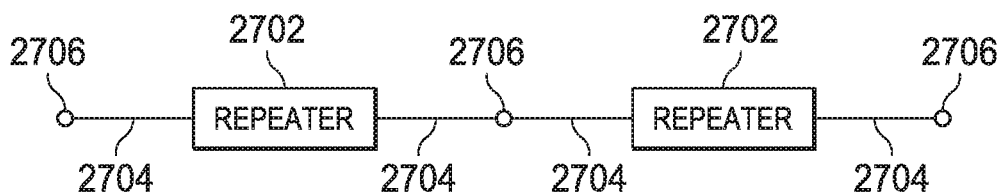
FIG. 27 illustrates a nodal quantum key distribution network.

Referring now to FIGS. 26 and 27, there are illustrated various components of multi-user orbital angular momentum based quantum key distribution multi-access network. FIG. 26 illustrates a high speed single photon detector 2602 positioned at a network node that can be shared between multiple users 2604 using conventional network architectures, thereby significantly reducing the hardware requirements for each user added to the network. In an embodiment, the single photon detector 2602 may share up to 64 users. This shared receiver architecture removes one of the main obstacles restricting the widespread application of quantum key distribution. The embodiment presents a viable method for realizing multi-user quantum key distribution networks with resource efficiency.

Referring now also to FIG. 27, in a nodal quantum key distribution network, multiple trusted repeaters 2702 are connected via point to point links 2704 between node 2706. The repeaters are connected via point to point links between a quantum transmitter and a quantum receiver. These point to point links 2704 can be realized using long distance optical fiber lengths and may even utilize ground to satellite quantum key distribution communication. While point to point connections 2704 are suitable to form a backbone quantum core network, they are less suitable to provide the last-mile service needed to give a multitude of users access to the quantum key distribution infrastructure. Reconfigurable optical networks based on optical switches or wavelength division multiplexing may achieve more flexible network structures, however, they also require the installation of a full quantum key distribution system per user which is prohibitively expensive for many applications.

The quantum key signals used in quantum key distribution need only travel in one direction along a fiber to establish a secure key between the transmitter and the receiver. Single photon quantum key distribution with the sender positioned at the network node 2706 and the receiver at the user premises therefore lends itself to a passive multi-user network approach. However, this downstream implementation has two major shortcomings. Firstly, every user in the network requires a single photon detector, which is often expensive and difficult to operate. Additionally, it is not possible to deterministically address a user. All detectors, therefore, have to operate at the same speed as a transmitter in order not to miss photons, which means that most of the detector bandwidth is unused.

Most systems associated with a downstream implementation can be overcome. The most valuable resource should be shared by all users and should operate at full capacity. One can build an upstream quantum access network in which the transmitters are placed at the end user location and a common receiver is placed at the network node. This way, an operation with up to 64 users is feasible, which can be done with multi-user quantum key distribution over a 1×64 passive optical splitter.

Thus, using various configurations of the above described orbital angular momentum processing, multi-layer overlay modulation, and quantum key distribution within various types of communication networks and more particularly optical fiber networks and free-space optic communication network, a variety of benefits and improvements in system bandwidth and capacity maybe achieved.

As discussed, current blockchain has two one-way technologies: cryptographic hash functions and digital signatures. A hash is a fixed length of data generated from a blockchain transaction. The hash is unique to that transaction. Even if a single bit is changed on the transaction, the hash is completely changed. Thus, it would normally take years and years of computation to reverse engineer the hash to a transaction. Thus rendering it a one-way process. Blockchain platforms have elliptic curve public-key cryptography (ECDSA) or the large integer factorization (RSA) to generate a digital signature using the hash. The security of these algorithms assumes computational complexity and therefore not easy to reverse engineer.

However, a quantum computer can solve these problems fast and efficiently and reverse engineer the hash making classical blockchains insecure. As discussed, Shor's quantum algorithm solves factorization of large integers in polynomial time and Grover's search algorithm has a quadratic speedup in calculating the inverse hash function (reverse engineer).

By applying quantum QKD as the cryptographic technique to classical blockchain, it is no longer possible to reverse engineer the hash. Current QKD cryptography techniques use 2-state q-bits "a|0⟩+b|1⟩" (only 2 orthogonal states |0⟩ and |1⟩) which are 2 polarization states due to 2 state of spin of photons or radix-2). However, the present implementation uses N-sates q-dits enabling any value of N greater than 2 (N could be 10 or radix-10) which means having 10 orthogonal states for my "multi-dimensional" QKD using 10 OAMs of photons in fiber or wireless networks.

Figure 28:
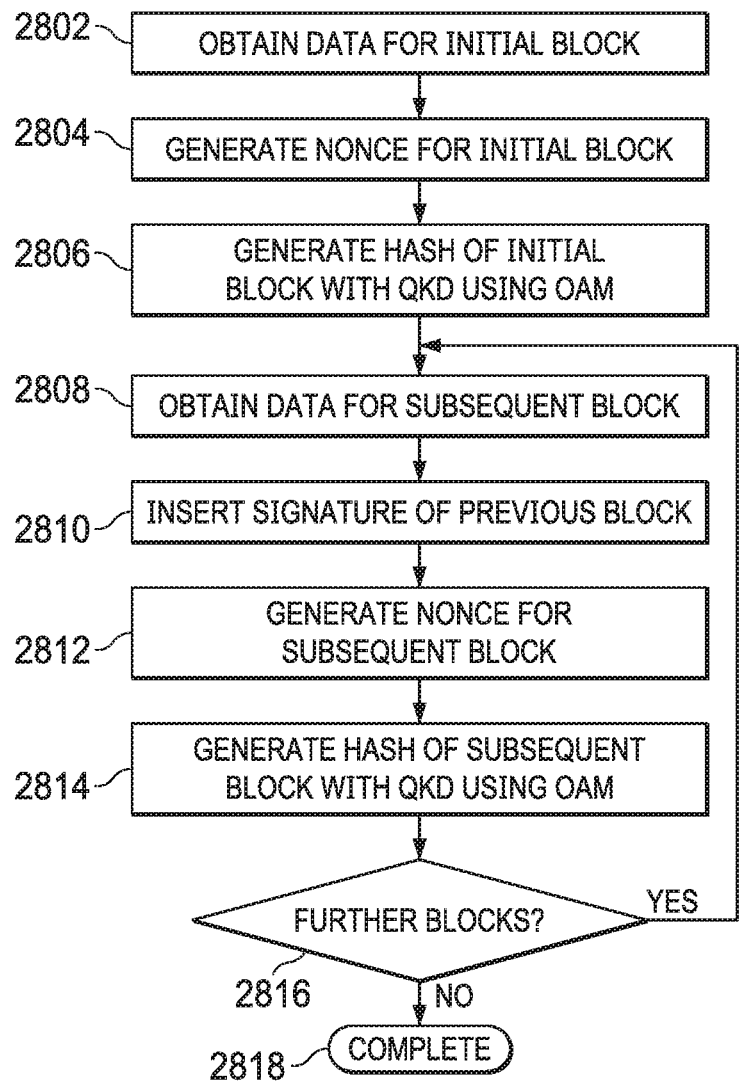
FIG. 28 is a flow diagram of a process for creating a blockchain using quantum key distribution with orbital angular momentum.
Figure 29:
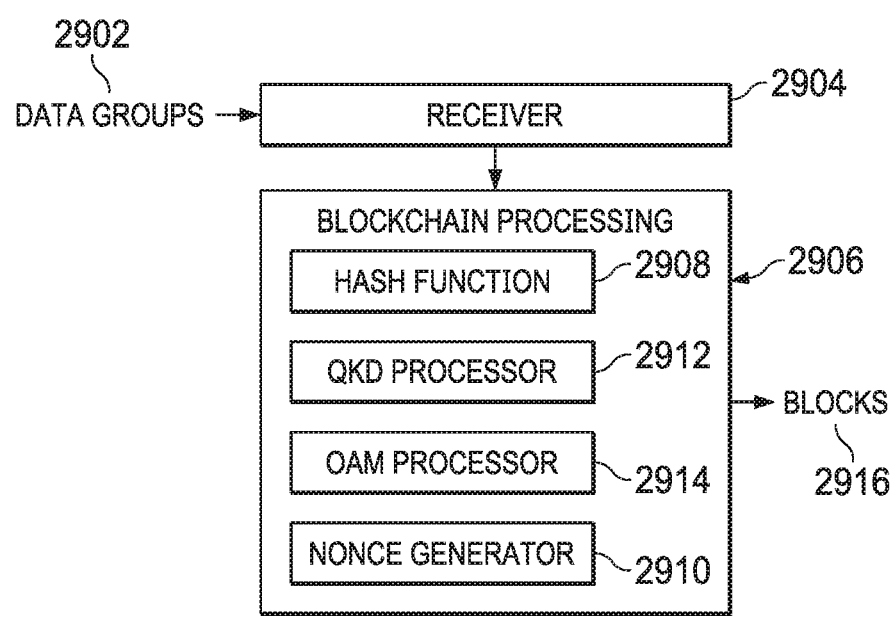
FIG. 29 is a functional block diagram of a system for performing the process of FIG. 28.

Referring now to FIG. 28 and FIG. 29, there is illustrated the manner in which a block chain may be created using a multistate quantum key distribution using OAM encryption technique may be utilized. Initially, at step 2802 the data for an initial block of the blockchain is obtained. The data may be of any type that is to be encoded within the blockchain signature. A nonce for the initial block is generated at step 2804. As described previously, the nonce is merely a random number generated in order to achieve a digital signature result according to predetermined parameters by the blockchain hash process. A hash of the initial block that includes the obtained data in the generated nonce is generated at step 2806. The hash is created using quantum key distribution using orbital angular momentum in the manner described hereinabove. A hash function uses and encryption technique to reduce the hash. A two-state quantum key distribution can be used as an encryption technique to generate the hash. However, the techniques according to the current approach use a higher order quantum key distribution as the encryption technique for the hash function. These quantum key distribution techniques may further be improved utilizing the addition of orbital angular momentum in the manner similar to that described hereinabove.

The next walk may then be created within the block chain and additional data is obtained at step 2808 for the subsequent block to be created. The digital signature from the previous block is inserted with the data obtained for the subsequent block at step 2810. A nonce is generated at step 2812 for the subsequent block and a hash is then generated for the subsequent block at step 2814. The hash is created using quantum key distribution using orbital angular momentum in the manner described hereinabove. A hash function uses and encryption technique to reduce the hash. A two-state quantum key distribution can be used as an encryption technique to generate the hash. However, the techniques according to the current approach use a higher order quantum key distribution as the encryption technique for the hash function. These quantum key distribution techniques may further be improved utilizing the addition of orbital angular momentum in the manner similar to that described hereinabove. Inquiry step 2816 determines if there are any additional blocks to be created with new data and if not the process is completed at step 2818. If additional blocks must be created control passes back to step 20 80 wait to obtain the data associated with the new life. The process then proceeds in a similar manner to generate the new blocks.

Referring now to FIG. 29, there is illustrated a functional block diagram of the system for performing the process of FIG. 28. Various data groups 2902 to be incorporated into the blockchain are provided to a receiver 2904. The receiver 2904 provides the groups of data 2902 to blockchain processing circuitry 2906. The blockchain processing circuitry 2906 provides a hash function 2908 that utilizes various inputs for generating a digital signature output. The hash function 2908 utilizes a quantum key distribution processor 2912 using N-state qudits (N greater than 2) for implementing QKD within the encryption of the hash function 2908 and an orbital angular momentum processor for implementing OAM within the hash function 2908. The hash function 2908 also makes use of a nonce generator 2910 for generating the nonce for use in the hash function and digital signatures created for a preceding block in the blockchain. The output of the hash function may then be used for providing a block 2916 in the blockchain.

It will be appreciated by those skilled in the art having the benefit of this disclosure that this quantum resistant blockchain with multi-dimensional quantum key distribution system provides a block chain implementation that is resistant to quantum computing based encryption techniques. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for generating a blockchain, comprising:
performing a first hash using a first group of data and a first nonce as an input to a hash function to generate a first digital signature for a first block, wherein the hash function uses encryption based on quantum key distribution using N-state qudits, where N is greater than 2;
establishing the first block of the blockchain using the first group of data, the first nonce and the first digital signature;
performing a second hash using a second group of data, a second nonce and the first digital signature as an input to the hash function to generate a second digital signature for a second block, wherein the hash function uses encryption based on the quantum key distribution using N-state qudits, where N is greater than 2; and
establishing the second block of the blockchain using the second group of data, the second nonce, the first digital signature and the second digital signature.

2. The method of claim 1, wherein the hash function further uses quantum key distribution using orbital angular momentum to perform the first hash and the second hash.

3. The method of claim 1, wherein the hash function further uses quantum key distribution using an orthogonal function to perform the first hash and the second hash.

4. The method of claim 1, wherein the step of performing the first hash further comprises:
receiving the first group of data and the first nonce;
generating a first secret key using a quantum key generation process;
generating the first digital signature using the generated first secret key.

5. The method of claim 4, wherein the step of generating the first secret key further comprises:
selecting a series of random bits;
assigning a random basis to each of the selected series of random bits;
generating a first photon polarization state for each of the selected series of random bits responsive to the selected series of random bits and the assigned random basis for the selected series of random bits; and
determining the first secret key responsive to matching portions of the first photon polarization states and second photon polarization states.

6. The method of claim 4 further including processing the first group of data and the first nonce to associate an orthogonal function with the first group of data and the first nonce.

7. The method of claim 6, wherein the orthogonal function comprises at least one of a modified Hermite polynomials, Jacobi polynomials, Gegenbauer polynomials, Legendre polynomials, Chebyshev polynomials and Laguerre functions.

8. A system for generating a blockchain, comprising:
an input for receiving a plurality of groups of data;
blockchain processing circuitry for generating the blockchain for the plurality of groups of data, wherein the blockchain processing circuitry generates the blockchain by:
performing a first hash using a first group of data and a first nonce as an input to a hash function to generate a first digital signature for a first block, wherein the hash function uses encryption based on quantum key distribution using N-state qudits, where N is greater than 2;
establishing the first block of the blockchain using the first group of data, the first nonce and the first digital signature;
performing a second hash using a second group of data, a second nonce and the first digital signature as an input to the hash function to generate a second digital signature for a second block, wherein the hash function uses encryption based on the quantum key distribution using N-state qudits, where N is greater than 2; and
establishing the second block of the blockchain using the second group of data, the second nonce, the first digital signature and the second digital signature.

9. The system of claim 8, wherein the hash function further uses quantum key distribution using orbital angular momentum to perform the first hash and the second hash.

10. The system of claim 8, wherein the hash function further uses quantum key distribution using an orthogonal function to perform the first hash and the second hash.

11. The system of claim 8, wherein the performing the first hash by the blockchain processing circuitry further comprises:
receiving the first group of data and the first nonce;
generating a first secret key using a quantum key generation process;
generating the first digital signature using the generated first secret key.

12. The system of claim 11, wherein the generating the first secret key by the blockchain processing circuitry further comprises:
selecting a series of random bits;
assigning a random basis to each of the selected series of random bits;
generating a first photon polarization state for each of the selected series of random bits responsive to the selected series of random bits and the assigned random basis for the selected series of random bits; and determining the first secret key responsive to matching portions of the first photon polarization states and second photon polarization states.

13. The system of claim 11, wherein the blockchain processing circuity further generates the blockchain by processing the first group of data and the first nonce to associate an orthogonal function with the first group of data and the first nonce.

14. The system of claim 13, wherein the orthogonal function comprises at least one of a modified Hermite polynomials, Jacobi polynomials, Gegenbauer polynomials, Legendre polynomials, Chebyshev polynomials and Laguerre functions.

15. A method for generating a blockchain, comprising:
performing a first hash using a first group of data and a first nonce as an input to a hash function to generate a first digital signature for a first block, wherein the hash function uses encryption based on quantum key distribution combined with orbital angular momentum to provide greater than 2-state qudits;
establishing the first block of the blockchain using the first group of data, the first nonce and the first digital signature;
performing a second hash using a second group of data, a second nonce and the first digital signature as an input to the hash function to generate a second digital signature for a second block, wherein the hash function uses encryption based on the quantum key distribution combined with the orbital angular momentum to provide greater than 2-state qudits; and
establishing the second block of the blockchain using the second group of data, the second nonce, the first digital signature and the second digital signature.

16. The method of claim 15, wherein the step of performing the first hash further comprises:
receiving the first group of data and the first nonce;
generating a first secret key using a quantum key generation process;
generating the first digital signature using the generated first secret key.

17. The method of claim 16, wherein the step of generating the first secret key further comprises:
selecting a series of random bits;
assigning a random basis to each of the selected series of random bits;
generating a first photon polarization state for each of the selected series of random bits responsive to the selected series of random bits and the assigned random basis for the selected series of random bits; and
determining the first secret key responsive to matching portions of the first photon polarization states and second photon polarization states.

18. The method of claim 15 further including processing the first group of data and the first nonce to associate an orthogonal function with the first group of data and the first nonce.

19. The method of claim 18, wherein the orthogonal function comprises at least one of a modified Hermite polynomials, Jacobi polynomials, Gegenbauer polynomials, Legendre polynomials, Chebyshev polynomials and Laguerre functions.

20. The method of claim 15, wherein the hash function uses encryption based on quantum key distribution using N-state qudits, where N is greater than 2.

21. A system for generating a blockchain, comprising:
an input for receiving a plurality of groups of data;
blockchain processing circuitry for generating the blockchain for the plurality of groups of data, wherein the blockchain processing circuitry generates the blockchain by:
performing a first hash using a first group of data and a first nonce as an input to a hash function to generate a first digital signature for a first block, wherein the hash function uses encryption based on quantum key distribution combined with orbital angular momentum to provide greater than 2-state qudits;
establishing the first block of the blockchain using the first group of data, the first nonce and the first digital signature;
performing a second hash using a second group of data, a second nonce and the first digital signature as an input to the hash function to generate a second digital signature for a second block, wherein the hash function uses encryption based on the quantum key distribution combined with the orbital angular momentum to provide greater than 2-state qudits; and
establishing the second block of the blockchain using the second group of data, the second nonce, the first digital signature and the second digital signature.

22. The system of claim 21, wherein the performing the first hash by the blockchain processing circuitry further comprises:
receiving the first group of data and the first nonce;
generating a first secret key using a quantum key generation process;
generating the first digital signature using the generated first secret key.

23. The system of claim 22, wherein the step of generating the first secret key by the blockchain processing circuitry further comprises:
selecting a series of random bits;
assigning a random basis to each of the selected series of random bits;
generating a first photon polarization state for each of the selected series of random bits responsive to the selected series of random bits and the assigned random basis for the selected series of random bits; and
determining the first secret key responsive to matching portions of the first photon polarization states and second photon polarization states.

24. The system of claim 21 further including processing the first group of data and the first nonce to associate with the first group of data and the first nonce an orthogonal function.

25. The system of claim 24, wherein the orthogonal function comprises at least one of a modified Hermite polynomials, Jacobi polynomials, Gegenbauer polynomials, Legendre polynomials, Chebyshev polynomials and Laguerre functions.

26. The system of claim 21, wherein the hash function uses encryption based on quantum key distribution using N-state qudits, where N is greater than 2.

* * * * *